(12) United States Patent
Hu et al.

(10) Patent No.: US 12,279,544 B2
(45) Date of Patent: Apr. 22, 2025

(54) SELF-PROPELLED FULL-AUTOMATIC DENSE-PLANTING VEGETABLE TRANSPLANTER AND PLANTING CONTROL METHOD THEREOF

(71) Applicant: Jiangsu University, Jiangsu (CN)

(72) Inventors: Jianping Hu, Jiangsu (CN); Jiawei Shi, Jiangsu (CN); Tianyi Zeng, Jiangsu (CN); Rongjun Tan, Jiangsu (CN); Wei Liu, Jiangsu (CN); Rencai Yue, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/575,332

(22) PCT Filed: Jun. 19, 2023

(86) PCT No.: PCT/CN2023/101007
§ 371 (c)(1),
(2) Date: Dec. 29, 2023

(87) PCT Pub. No.: WO2024/174429
PCT Pub. Date: Aug. 29, 2024

(65) Prior Publication Data
US 2025/0072314 A1    Mar. 6, 2025

(30) Foreign Application Priority Data
Feb. 22, 2023    (CN) .......................... 202310151199.7

(51) Int. Cl.
*A01C 11/02*    (2006.01)
(52) U.S. Cl.
CPC ................................. *A01C 11/025* (2013.01)
(58) Field of Classification Search
CPC ..... A01C 11/025; A01C 11/006; A01C 11/02; A01C 11/00; A01B 79/005; A01G 9/0299
See application file for complete search history.

(56) References Cited

U.S. PATENT DOCUMENTS

| 4,947,579 A | * | 8/1990 | Harrison | ................ | A01G 9/086 |
| | | | | | 47/1.01 R |
| 5,215,550 A | * | 6/1993 | Tesch, Jr. | ............. | A01C 11/025 |
| | | | | | 111/104 |

(Continued)

FOREIGN PATENT DOCUMENTS

| CN | 107667637 | 2/2018 |
| CN | 108337967 | 7/2018 |

(Continued)

OTHER PUBLICATIONS

"International Search Report (Form PCT/ISA/210) of PCT/CN2023/101007," mailed on Oct. 24, 2023, pp. 1-5.

(Continued)

*Primary Examiner* — Jamie L McGowan
(74) *Attorney, Agent, or Firm* — JCIPRNET

(57) ABSTRACT

A self-propelled full-automatic dense-planting vegetable transplanter and control method thereof includes a seedling taking and throwing mechanism, a box moving device, a crawler-type walking chassis, a seedling guiding device, a soil covering mechanism, a planting mechanism, and a dispersing device. The box moving device is mounted on the crawler-type walking chassis. The dispersing device is located on one side of the box moving device. The seedling taking and throwing mechanism includes a seedling taking and throwing movement mechanism and a linear movement mechanism. The linear movement mechanism is arranged above the box moving device. The seedling taking and throwing movement mechanism is configured to reciprocate between the dispersing device and the box moving device through the linear movement mechanism. The dispersing device is connected to the seedling guiding device.

9 Claims, 21 Drawing Sheets

(56) References Cited

U.S. PATENT DOCUMENTS

| | | | | |
|---|---|---|---|---|
| 5,765,491 A * | 6/1998 | Brower | .............. | A01C 11/025 111/105 |
| 5,842,306 A * | 12/1998 | Onosaka | .............. | A01G 9/086 47/1.01 R |
| 6,044,778 A * | 4/2000 | Shokaku | .............. | A01C 11/025 111/105 |
| 6,634,306 B1 * | 10/2003 | Faulring | .............. | A01C 11/025 111/900 |
| 6,915,607 B2 * | 7/2005 | Tagawa | .............. | A01C 11/025 47/87 |
| 7,905,186 B2 * | 3/2011 | Faulring | .............. | A01G 9/0299 111/919 |
| 8,573,142 B2 * | 11/2013 | Faulring | .............. | A01C 11/025 111/919 |
| 9,661,800 B2 * | 5/2017 | Buell | .............. | A01C 11/02 |
| 10,292,325 B2 * | 5/2019 | Azenha | .............. | A01C 5/068 |
| 10,299,428 B2 * | 5/2019 | Aikala | .............. | A01C 11/02 |
| 11,166,407 B2 * | 11/2021 | Crouse | .............. | A01C 11/025 |
| 11,172,603 B2 * | 11/2021 | Hu | .............. | A01C 11/025 |
| 11,259,458 B2 * | 3/2022 | Hu | .............. | A01C 11/025 |
| 11,350,560 B1 * | 6/2022 | Buell | .............. | A01C 11/025 |
| 11,382,259 B2 * | 7/2022 | Hu | .............. | A01C 11/025 |
| 2012/0174839 A1 * | 7/2012 | Faulring | .............. | A01C 11/025 111/100 |
| 2015/0342112 A1 * | 12/2015 | Buell | .............. | A01C 11/02 111/105 |
| 2018/0084713 A1 * | 3/2018 | Ito | .............. | A01G 9/0299 |
| 2020/0120860 A1 * | 4/2020 | Hu | .............. | A01C 11/025 |
| 2020/0260636 A1 * | 8/2020 | Ito | .............. | A01C 11/00 |
| 2020/0375089 A1 * | 12/2020 | Crouse | .............. | A01C 11/025 |
| 2021/0015027 A1 * | 1/2021 | Moiddin | .............. | A01C 11/006 |
| 2021/0329830 A1 * | 10/2021 | Hu | .............. | A01C 11/025 |
| 2021/0329831 A1 * | 10/2021 | Hu | .............. | A01C 11/025 |
| 2021/0352839 A1 * | 11/2021 | Hu | .............. | A01C 11/025 |
| 2022/0217893 A1 * | 7/2022 | Nakamura | .............. | A01B 69/008 |
| 2022/0217899 A1 * | 7/2022 | Hasoon | .............. | A01C 11/006 |
| 2022/0240436 A1 * | 8/2022 | Stewart | .............. | A01G 24/20 |
| 2022/0264791 A1 * | 8/2022 | Arvidsson | .............. | A01B 79/005 |

FOREIGN PATENT DOCUMENTS

| | | |
|---|---|---|
| CN | 207612609 | 7/2018 |
| CN | 109005811 | 12/2018 |
| CN | 113016303 | 6/2021 |
| CN | 116195409 | 6/2023 |
| JP | 2019187334 | 10/2019 |
| JP | 2022150753 | 10/2022 |

OTHER PUBLICATIONS

"Written Opinion of the International Searching Authority (Form PCT/ISA/237) of PCT/CN2023/101007," mailed on Oct. 24, 2023, pp. 1-4.

* cited by examiner

SELF-PROPELLED FULL-AUTOMATIC DENSE-PLANTING VEGETABLE TRANSPLANTER AND PLANTING CONTROL METHOD THEREOF

CROSS-REFERENCE TO RELATED APPLICATION

This application is a 371 of international application of PCT application serial no. PCT/CN2023/101007, filed on Jun. 19, 2023, which claims the priority benefit of China application no. 202310151199.7, filed on Feb. 22, 2022. The entirety of each of the above-mentioned patent applications is hereby incorporated by reference herein and made a part of this specification.

BACKGROUND

Technical Field

The present disclosure relates to the technical field of agricultural planting machinery, and specifically to a self-propelled full-automatic dense-planting vegetable transplanter and a planting control method thereof.

Description of Related Art

China is a big agricultural country, with a vegetable planting area of over 350 million mu and an annual vegetable output of over 775 million tons. It is the largest vegetable producer and consumer in the world. Green leafy vegetables are the main dense-planting vegetables, and the demand is the greatest. The main difference between a dense-planting vegetable transplanter and a conventional vegetable transplanter lies in that more rows of vegetables are planted in a single ridge.

In the prior art, a seedling taking and throwing mechanism is disclosed, which can automatically take and throw seedlings. A driving component cooperates with a vertical guiding component to enable the seedling taking component to grasp seedlings, and then cooperates with a horizontal guiding component to move the seedling taking component, so that seedlings in a plug tray can be grasped and then accurately put into seedling guiding barrels or planting tubes. However, the seedling taking and throwing mechanism is driven by a cylinder, and only supports two simple movements, i.e., moving straight up and straight down with a fixed stroke. As a result, the seedling taking component is inserted into the plug seedling from right above, causing great damage to the leaves and stems of the seedlings. During seedling throwing, the single downward pushing movement is likely to cause seedling hanging, leading to low transplanting quality and success rate.

At present, most of seedling dispersing mechanisms in the market are cup-type seedling dispersing mechanisms. Such seedling dispersing mechanisms require the number of seedling cups to be an integer multiple of the chain pitch, leading to low distribution flexibility of the number and spacing of seedling cups. The seedlings need to be thrown at intervals, and cannot planted in a whole line in multiple rows, leading to low precision and efficiency.

At present, foreign transplanters for dense-planting vegetables are usually large, and cannot adapt to the actual situation in China. Domestic dense-planting transplanters has low transplanting efficiency and cannot realize a full-automatic planting process. Therefore, there is an urgent need of a full-automatic dense-planting vegetable transplanter with high transplanting efficiency.

SUMMARY

To overcome the drawbacks in the prior art, the present disclosure provides a self-propelled full-automatic dense-planting vegetable transplanter and a planting control method thereof, to effectively solve the problems of seedling leaf damage and seedling entrainment caused by the insertion of seedling taking claws from right above seedlings to take the seedlings, reduce damage to plug seedlings, ensure the integrity of plug seedlings, and increase the success rate of seedling taking, thereby ensuring the success rate of planting.

The above technical object of the present disclosure is attained with the following technical means.

A self-propelled full-automatic dense-planting vegetable transplanter is provided, including a seedling taking and throwing mechanism, a box moving device, a crawler-type walking chassis, a seedling guiding device, a soil covering mechanism, a planting mechanism, and a dispersing device, where the box moving device is mounted on the crawler-type walking chassis to feed a plug tray. The dispersing device is located on one side of the box moving device. The seedling taking and throwing mechanism includes a seedling taking and throwing movement mechanism and a linear movement mechanism. The linear movement mechanism is arranged above the box moving device. The seedling taking and throwing movement mechanism is configured to reciprocate between the dispersing device and the box moving device through the linear movement mechanism. The dispersing device is connected to the seedling guiding device, and the planting mechanism is located at a bottom of the seedling guiding device and is configured to transplant a plug seedling. The soil covering mechanism is mounted on the crawler-type walking chassis, and the soil covering mechanism is located behind the planting mechanism to cover soil on a planted plug seedling; and the seedling taking and throwing movement mechanism includes a forward-backward movable fixing plate, a seedling taking and throwing movement component, a seedling taking needle movement component, a lead screw motor, and a seedling taking needle movement cylinder. A top of the forward-backward movable fixing plate is connected to the linear movement mechanism through a first sliding pair. The forward-backward movable fixing plate is connected to the seedling taking and throwing movement component through a second sliding pair, the lead screw motor is mounted on the forward-backward movable fixing plate, and a push rod of the lead screw motor is connected to the seedling taking and throwing movement component to drive the seedling taking and throwing movement component to move vertically. The seedling taking and throwing movement component is connected to the seedling taking needle movement component through a third sliding pair, the seedling taking needle movement cylinder is mounted on the seedling taking and throwing movement component, and a piston rod of the seedling taking needle movement cylinder is connected to the seedling taking needle movement component to drive the seedling taking needle movement component to move vertically.

Further, the seedling taking and throwing movement component includes a seedling taking and throwing movement plate, seedling pushing ring connecting plates, and seedling pushing rings; a first guide rail is mounted on one side surface of the seedling taking and throwing movement plate, a first slide block is mounted on the forward-backward movable fixing plate, and the first slide block is movably mounted on the first guide rail; the one side surface of the seedling taking and throwing movement plate is connected to the push rod of the lead screw motor; the seedling taking needle movement cylinder is mounted on an other side surface of the seedling taking and throwing movement plate; a plurality of the seedling pushing ring connecting plates are mounted at a bottom of the other side surface of the seedling taking and throwing movement plate, and the seedling pushing rings are respectively mounted on the seedling pushing ring connecting plates:

the seedling taking needle movement component includes a seedling taking needle movement pressing plate, fixing plate connecting plates, seedling taking needle fixing plates, and seedling taking needles; a second slide block is mounted on one side surface of the seedling taking needle movement pressing plate, a second guide rail is mounted on the other side surface of the seedling taking and throwing movement plate, and the second slide block is movably mounted on the second guide rail; the one side surface of the seedling taking needle movement pressing plate is connected to the piston rod of the seedling taking needle movement cylinder; a plurality of the fixing plate connecting plates are arranged at a bottom of an other side surface of the seedling taking needle movement pressing plate, and the fixing plate connecting plates correspond one-to-one to the seedling pushing ring connecting plates; and two sides of the fixing plate connecting plates are respectively connected to the seedling taking needles through the seedling taking needle fixing plates.

Further, one end of each of the seedling taking needle fixing plates is hingedly connected with a corresponding one of the fixing plate connecting plates, ends of the seedling taking needles on the fixing plate connecting plates respectively pass through the seedling pushing rings, and when the seedling taking needle fixing plates are raised to a highest position, the ends of the seedling taking needles are in a same horizontal plane as ends of the seedling pushing rings.

Further, the dispersing device includes a mounting frame, a transverse movement guide rail, transverse movement slide blocks, dispersion seedling guiding barrels, dispersing duckbill ports, a C-shaped motor fixing plate, and a dispersing rack; the transverse movement guide rail is arranged on the mounting frame, the dispersion seedling guiding barrels are respectively connected to the transverse movement slide blocks through the C-shaped motor fixing plate, and a plurality of the transverse movement slide blocks are movably mounted on the transverse movement guide rail; a driving unit is mounted in the C-shaped motor fixing plate, the dispersing rack is arranged on the mounting frame, and the driving unit is cooperated with the dispersing rack through a transmission unit to drive the dispersion seedling guiding barrels to move transversely; and a pair of the dispersing duckbill ports are arranged at a bottom of each of the dispersion seedling guiding barrels, and the dispersing duckbill ports of a plurality of the dispersion seedling guiding barrels are synchronously opened or closed by a synchronizing mechanism.

Further, the synchronization mechanism includes opening/closing cylinder connecting plates, opening/closing cylinders, dispersing duckbill port opening/closing rods, a hinge connecting clasp ring, and a dispersing duckbill port opening/closing hinge; the hinge connecting clasp ring is arranged at the bottom of each of the dispersion seedling guiding barrels, the dispersing duckbill port opening/closing hinge is mounted on one end of each of a pair of the dispersing duckbill ports, and one end of each dispersing duckbill port opening/closing hinge is hingedly connected with the hinge connecting clasp ring; the opening/closing cylinders are mounted respectively on two sides of the mounting frame, a piston rod of each of the opening/closing cylinders is provided with a corresponding one of the opening/closing cylinder connecting plates, and two of the opening/closing cylinder connecting plates are connected by two parallel dispersing duckbill port opening/closing rods; and the two dispersing duckbill port opening/closing rods respectively pass through the dispersing duckbill port opening/closing hinge on two sides of the hinge connecting clasp ring, and the opening/closing cylinders are controlled to expand or retract to drive the dispersing duckbill port opening/closing rods to move vertically, to synchronously open or close the dispersing duckbill ports of the plurality of the dispersion seedling guiding barrels.

Further, the soil covering mechanism includes soil covering wheel components, a clamping support, a bare shaft, a soil covering mechanism bracket, and an electric push rod; two ends of the bare shaft each are provided with the clamping support, and the clamping support is connected to the crawler-type walking chassis through a main frame; a lower end of the soil covering mechanism bracket is supported on the bare shaft, an upper end of the soil covering mechanism bracket is hingedly connected with one end of a push rod of the electric push rod, and a base of the electric push rod is mounted on the main frame; a plurality of the soil covering wheel components are arranged at the lower end of the soil covering mechanism bracket, and a telescopic length of the electric push rod is adjusted to adjust an above-ground height of the soil covering wheel components;

each of the soil covering wheel components includes a soil covering wheel, a U-shaped soil covering wheel fixing plate, a soil covering wheel sliding rod, a soil covering compression spring, a soil covering wheel guiding block, and a positioning pin; the soil covering wheel is mounted on each of two sides of a bottom of the U-shaped soil covering wheel fixing plate, a lower end of the soil covering wheel sliding rod is connected to the U-shaped soil covering wheel fixing plate, the soil covering wheel guiding block is movably mounted on the soil covering wheel sliding rod, and an upper end of the soil covering wheel sliding rod limits a moving position of the soil covering wheel guiding block through the positioning pin; the soil covering wheel guiding block is connected to the soil covering mechanism bracket; and the soil covering compression spring is mounted on the soil covering wheel sliding rod, and the soil covering compression spring is located between the U-shaped soil covering wheel fixing plate and the soil covering wheel guiding block.

Further, the self-propelled full-automatic dense-planting vegetable transplanter further includes a seedling taking and throwing vertical position sensor, a seedling taking and throwing front-rear position sensor, and a control system, where the seedling taking and throwing vertical position sensor is mounted on the forward-backward movable fixing plate to detect whether the seedling taking and throwing movement component reaches a highest initial position; the seedling taking and throwing front-rear position sensor is mounted on a walking mechanism to detect whether the seedling taking and throwing movement mechanism is located above the dispersing device; and the control system is configured to respectively control operations of the walking mechanism, the lead screw motor, and the seedling taking needle movement cylinder according to position information from the seedling taking and throwing vertical position sensor and the seedling taking and throwing front-rear position sensor.

Further, a plurality of dispersion transverse position sensors are arranged on the mounting frame, and mounting positions of the dispersion transverse position sensors correspond one-to-one to positions of the dispersion seedling guiding barrels in a retracted state, to reset the dispersion seedling guiding barrels after dispersion.

A planting control method of the self-propelled full-automatic dense-planting vegetable transplanter is provided, including:

placing the plug tray on the box moving device; the control system controlling the box moving device to move the plug tray to a seedling taking position;

the control system controlling the walking mechanism to accelerate the seedling taking and throwing movement mechanism toward the seedling taking position; when the seedling taking and throwing movement mechanism moves to a set distance S1, the control system controlling the lead screw motor to lower the seedling taking and throwing movement component;

when the seedling taking and throwing movement mechanism accelerates and moves to a position at a distance of S2 from the seedling taking position, and a height from the ends of the seedling taking needles to an upper end surface of the plug tray reaches a set height H2, the control system controlling the lead screw motor to stop running, so that the seedling taking and throwing movement component stops descending: the control system controlling the walking mechanism to allow the seedling taking and throwing movement mechanism to decelerate and translate to the seedling taking position;

when the seedling taking and throwing movement mechanism reaches the seedling taking position, the control system controlling the seedling taking needle movement cylinder to allow the seedling taking needle movement component to move downward, so that the seedling taking needles are inserted into plug seedlings for seedling taking; the control system controlling the lead screw motor to move upward, to allow the seedling taking and throwing movement component to reach the highest initial position; the control system controlling the executing mechanism according to a signal sent by the seedling taking and throwing vertical position sensor to allow the seedling taking and throwing movement mechanism to accelerate and move toward the dispersing device;

when the seedling taking and throwing movement mechanism moves to a position at a distance of S3 from the dispersion seedling guiding barrels of the dispersing device, controlling the executing mechanism to decelerate the seedling taking and throwing movement mechanism, until the seedling taking and throwing movement mechanism decelerates and moves to exactly above the dispersion seedling guiding barrels of the dispersing device; the control system controlling the lead screw motor to move downward according to a signal sent by the seedling taking and throwing front-rear position sensor, so that an overall height of a seedling penetrates into two-thirds of the dispersion seedling guiding barrels; meanwhile, the control system controlling the seedling taking needle movement cylinder to retract a piston upward, to drive the seedling taking needle movement component to move upward, so that the seedling taking needles retract upward, and the plug seedlings are pushed into the dispersing device by the seedling pushing ring; the control system controlling the lead screw motor to move upward to reset the seedling throwing movement component;

when the plug seedlings fall into the dispersing duckbill ports along the dispersion seedling guiding barrels, controlling a plurality of the driving units to respectively drive the corresponding dispersion seedling guiding barrels to move, so that the dispersion seedling guiding barrels are dispersed to two sides of the transverse movement guide rail; controlling the piston rods of the opening/closing cylinders to stretch, to allow the dispersing duckbill port opening/closing rods to move downward along the dispersing duckbill port opening/closing hinge, so that the dispersing duckbill ports of the plurality of the dispersion seedling guiding barrels are opened synchronously; the plug seedlings falling into the planting duckbill ports of the planting mechanism along the seedling guiding device, and then allowing the piston rods of the opening/closing cylinders to retract to synchronously close the dispersing duckbill ports of the plurality of the dispersion seedling guiding barrels; controlling the plurality of the driving units to respectively drive the corresponding dispersion seedling guiding barrels to retract and move in a reverse direction for resetting; and after the plug seedlings fall into the planting duckbill ports of the planting mechanism, allowing the planting mechanism to move downward vertically, opening the planting duckbill ports at a lowest position, planting the plug seedlings into ground, then allowing the planting mechanism to move upward to an initial position, and closing the planting duckbill ports; and after the planting is completed, controlling a telescopic length of the electric push rod to adjust an above-ground height of the soil covering wheel component, and performing a soil covering operation on the planted plug seedlings.

Further, the set distance S1 is half of a distance between the seedling taking position and a seedling throwing position; S2 is 20 mm to 40 mm; S3 is 20 mm to 40 mm; and the set height H2 is 5 mm to 10 mm.

The advantages of the present disclosure are as follows.

1. In the self-propelled full-automatic dense-planting vegetable transplanter and the planting control method thereof according to the present disclosure, the electrical box is used to control the transplanter to travel at a low speed to cooperate with the seedling taking, seedling throwing, seedling separation, planting, and soil covering mechanisms, thereby achieving high-efficiency automated collaborative operation of the entire transplanter.

2. In the self-propelled full-automatic dense-planting vegetable transplanter and the planting control method thereof according to the present disclosure, when the seedling taking and throwing movement mechanism moves to a position that is 20 mm away from the seedling taking position, the seedling taking and throwing movement component is controlled to descend to a position at which the end of the seedling taking needle is 5 mm above the top of the plug tray, and then translate to the seedling taking position. After reaching the seedling taking position, the seedling taking needle is inserted downward into the plug to clamp the seedling. The seedling taking needle provides a function of combing the plug seedlings before being inserted into the plug to separate interlaced leaves of adjacent plug seedlings, to effectively solve the problems of seedling leaf damage and seedling entrainment caused by the insertion of seedling taking claws from right above seedlings to take the seedlings, reduce damage to plug seedlings, ensure the integrity of plug seedlings, and increase the success rate of seedling taking, thereby ensuring the success rate of planting.

3. In the self-propelled full-automatic dense-planting vegetable transplanter and the planting control method thereof according to the present disclosure, the seedling taking and throwing movement component is controlled to move downward into the dispersion seedling guiding barrel by 10 mm, and at the same time, the seedling taking needle component moves upward. In this way, when the entire seedling taking and throwing movement mechanism in the seedling throwing barrel moves downward, the seedling taking needle retracts upward, and the seedling pushing ring pushes the seedling downward, to effectively solve the problem of the plug seedling hanging to the seedling throwing barrel caused by the seedling pushing ring directly pushing the seedling downward from above the seedling throwing barrel in the prior art, thereby reducing seedling hanging, improving the success rate of seedling throwing, and ensuring the success rate of planting.

4. In the self-propelled full-automatic dense-planting vegetable transplanter and the planting control method thereof according to the present disclosure, quick and precise matching of any seedling taking and throwing spacing with any number of rows to be planted and any planting row spacing can be achieved through the seedling dispersing mode in which the motor drivers the dispersing duckbill ports through gear-rack engagement. In this way, high-efficiency planting in rows can be achieved, thereby effectively solving the problems of the existing cup-type seedling dispersing mode that due to the low distribution flexibility of the number and spacing of seedling cups, the seedlings need to be thrown at intervals and cannot planted in continuous rows, leading to low precision and efficiency.

5. In the self-propelled full-automatic dense-planting vegetable transplanter and the planting control method thereof according to the present disclosure, the above-ground height of the soil covering wheel component can be changed in real time according to the height of the ridge surface by adjusting the telescopic length of the electric push rod and allowing the soil covering wheel component to rotate about the bare shaft. In the case of uneven ridge surface, the soil covering wheel can overcome the pressure of the soil covering compression spring in the working process and move vertically along the soil covering wheel sliding rod in a certain range for real-time fine adjustment to ensure the stability of the pressure exerted on the soil, thereby achieving uniform soil covering with an appropriate amount of soil, achieving high-quality soil covering, and ensuring the success rate of planting.

BRIEF DESCRIPTION OF THE DRAWINGS

In order to more clearly explain the technical solutions in the embodiments of the present disclosure or in the prior art, the drawings used in the description of the embodiments or the prior art will be briefly described below. Obviously, the drawings depicted below are merely embodiments of the present disclosure, and those skilled in the art can obtain other drawings based on these drawings without any creative efforts.

DESCRIPTION OF THE EMBODIMENTS

Figure 1:
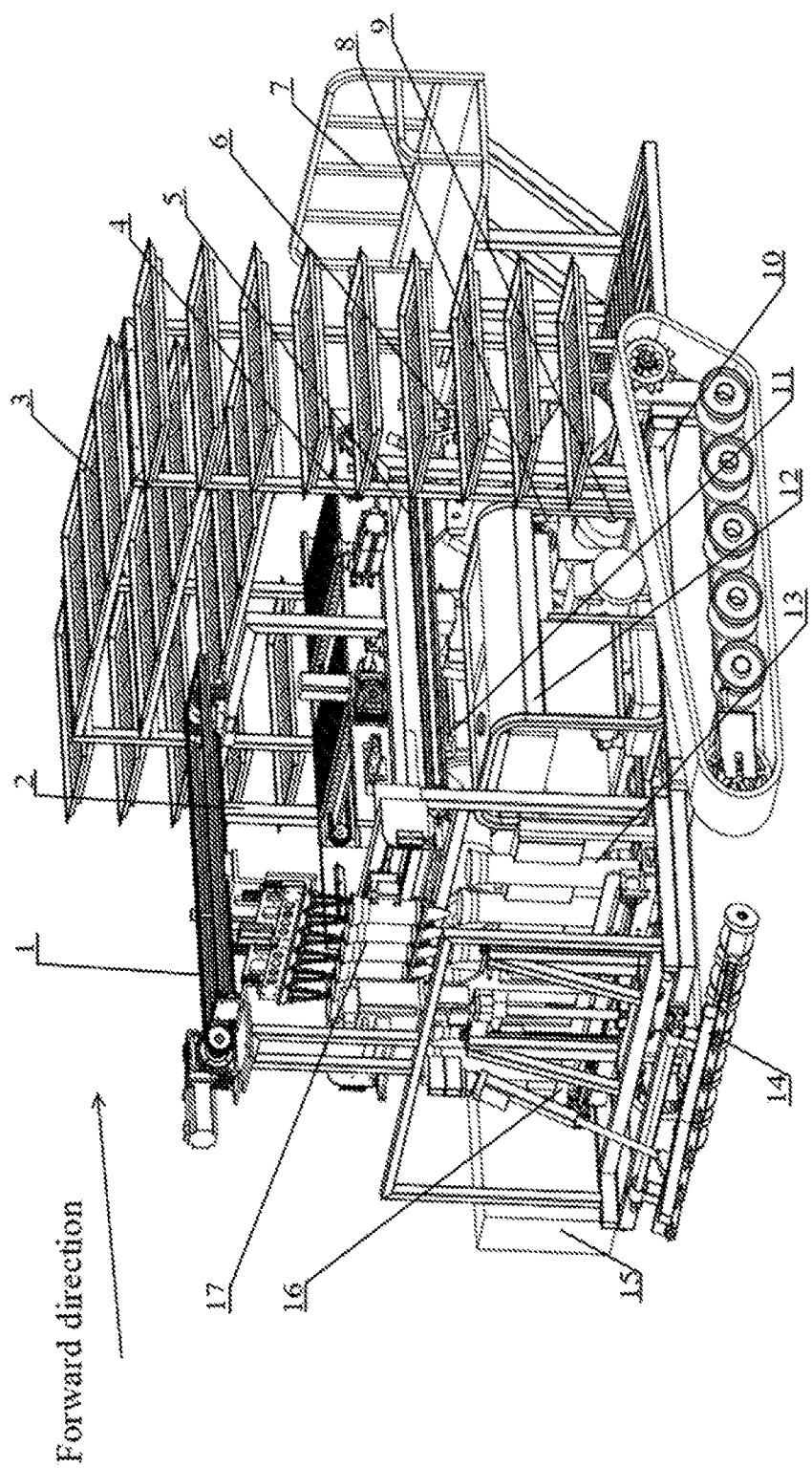
FIG. 1 is an overall perspective view of a self-propelled full-automatic dense-planting vegetable transplanter according to the present disclosure.
Figure 2:
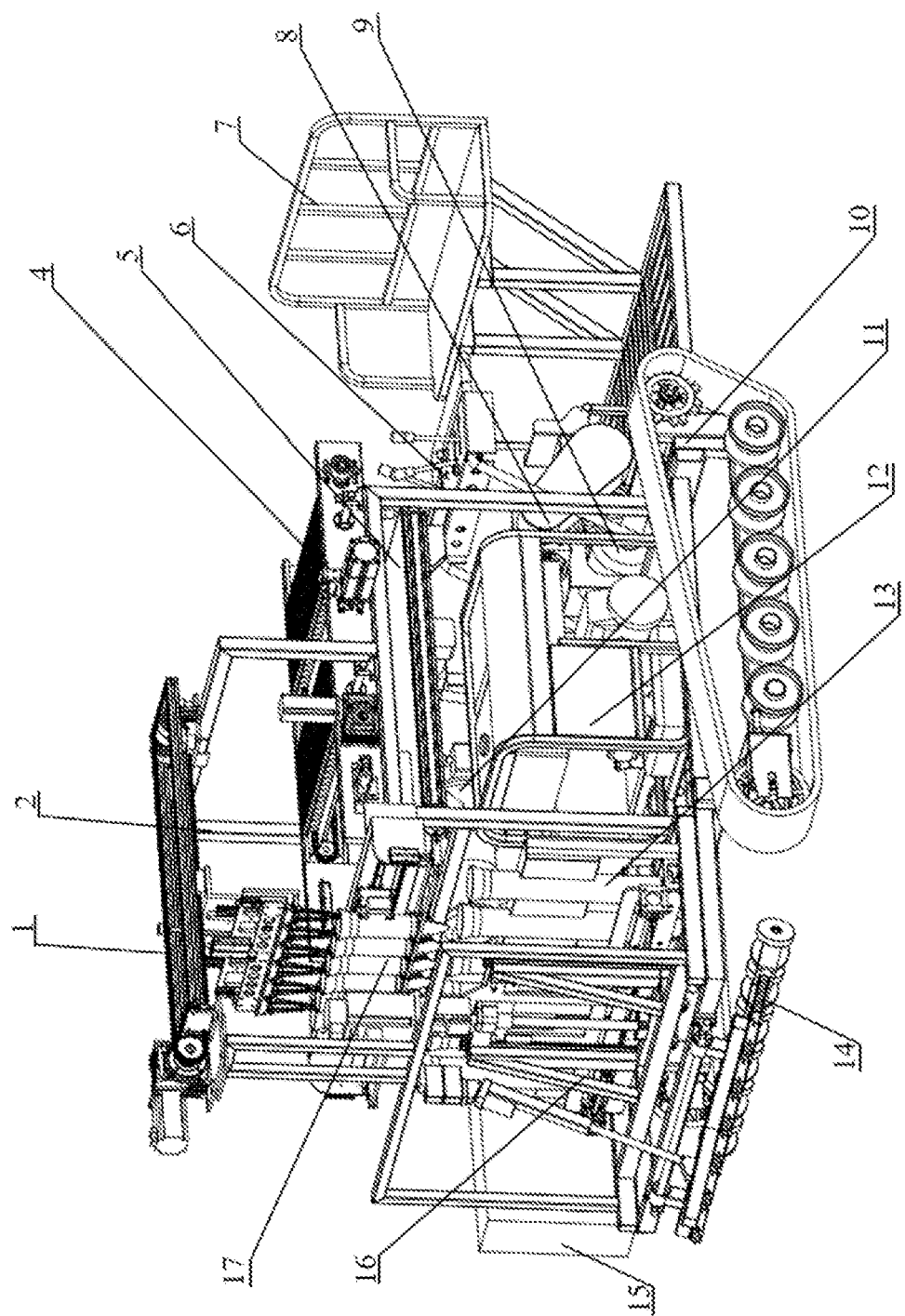
FIG. 2 is an overall perspective view of a self-propelled full-automatic dense-planting vegetable transplanter with a plug tray frame being hidden according to the present disclosure.
Figure 3:
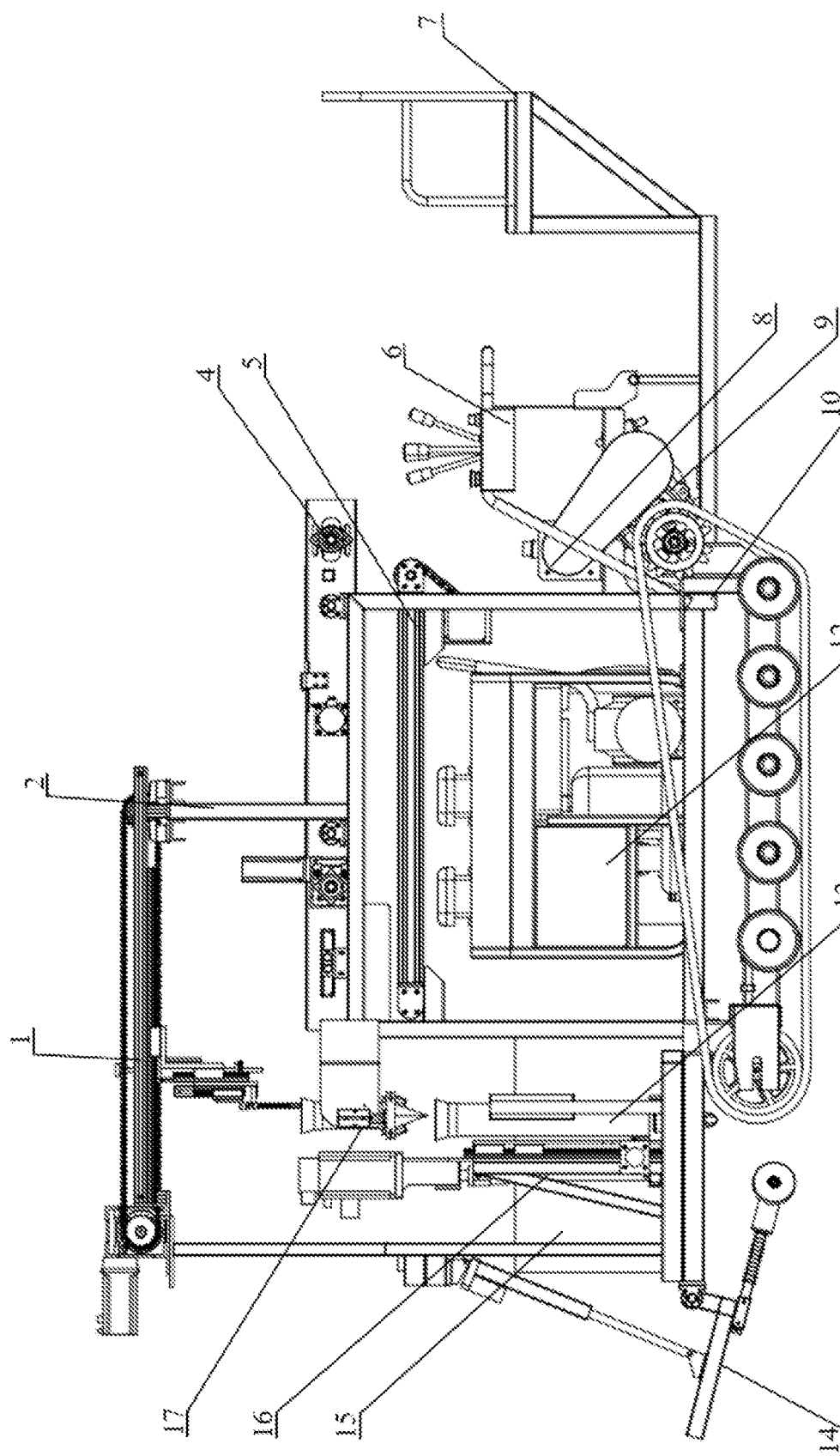
FIG. 3 is a front view of FIG. 1.
Figure 4:
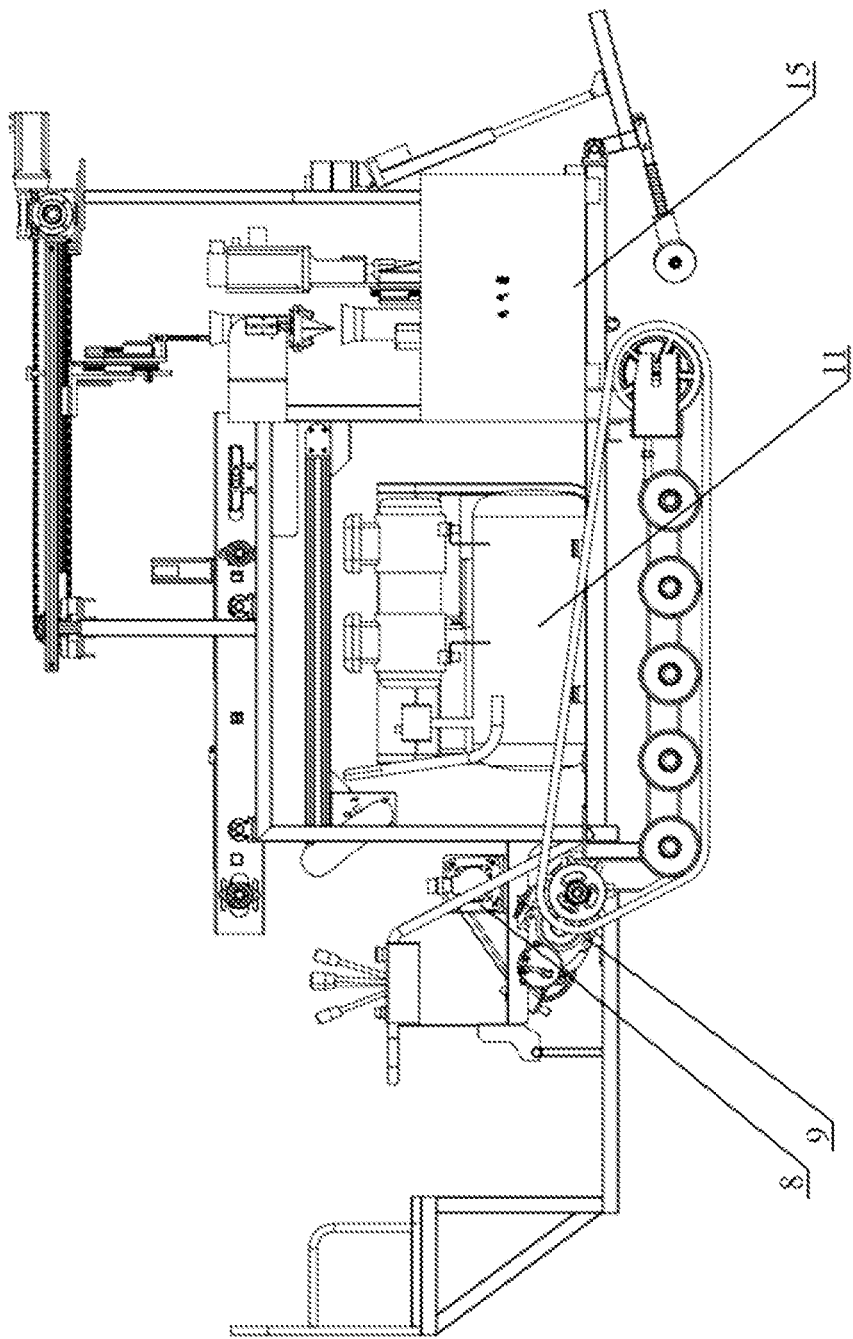
FIG. 4 is a rear view of FIG. 1.
Figure 5:
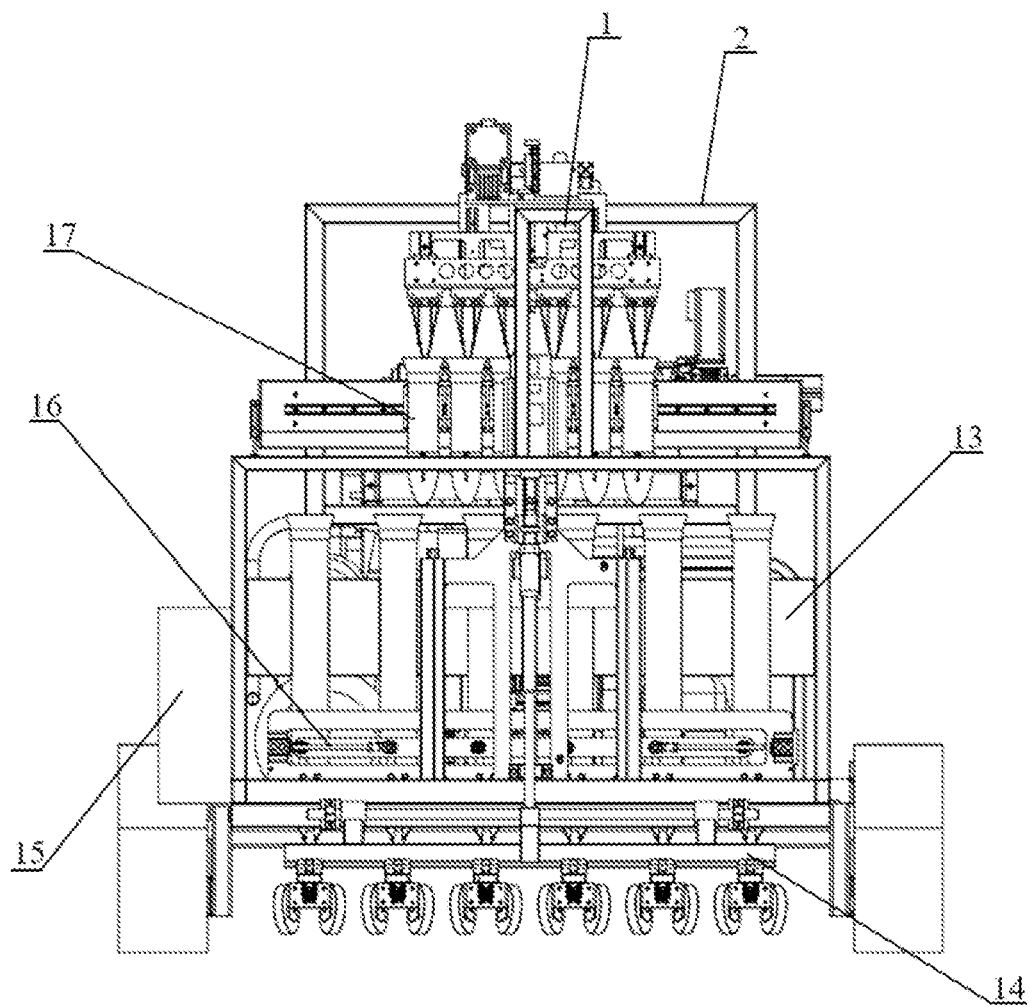
FIG. 5 is a left view of FIG. 1.

Embodiments of the present disclosure will be described in detail hereinafter with reference to accompanying drawings in which the same or like reference characters refer to the same or like elements or elements having the same or like functions throughout. The embodiments described below with reference to accompanying drawings are exemplary, and intended to explain, instead of limiting the present disclosure.

In the description of the present disclosure, it should be understood that the orientation or positional relationships indicated by the terms "center", "longitudinal", "transverse", "length", "width", "thickness", "upper", "lower", "axial", "radial", "vertical", "horizontal", "inner", "outer", etc. are based on the orientation or positional relationships shown in the drawings, and are only for the convenience of describing the present disclosure and simplifying the description, rather than indicating or implying that the apparatus or element described must have a specific orientation or be constructed and operated in a specific orientation, and therefore are not to be construed as limiting the present disclosure. Moreover, the terms "first" and "second" are used herein for purposes of description, and are not intended to indicate or imply relative importance or implicitly point out the number of the indicated technical feature. Therefore, the features defined by "first" and "second" may explicitly or implicitly include one or more features. In the description of the present disclosure, "plural" means two or more, unless it is defined otherwise specifically.

In the present disclosure, unless otherwise clearly specified and defined, the terms "mount", "connect", "couple", "fix" and variants thereof should be interpreted in a broad sense, for example, may be a fixed connection, a detachable connection, or an integral connection; may be a mechanical connection or an electrical connection; or may be a direct connection, an indirectly connection via an intermediate medium, or communication between the interiors of two components. For those of ordinary skill in the art, the specific meanings of the above terms in the present disclosure can be understood according to specific circumstances.

As shown in FIG. 1, FIG. 2, FIG. 3, FIG. 4, and FIG. 5, a self-propelled full-automatic dense-planting vegetable transplanter of the present disclosure includes a seedling taking and throwing mechanism 1, a main frame 2, a plug tray frame 3, a box moving device 4, a plug tray recovery mechanism 5, a console 6, a seat 7, a walking driving motor 8, a speed reducer 9, a crawler-type walking chassis 10, an air compressor 11, a power generator 12, a seedling guiding device 13, a soil covering mechanism 14, an electrical box 15, a planting mechanism 16, and a dispersing device 17.

The main frame 2 is mounted on the crawler-type walking chassis 10, and the soil covering mechanism 14 is located on the main frame 2 at one end of the crawler-type walking chassis 10. The planting mechanism 16 is fixedly mounted on the main frame 2 and on one side of the soil covering mechanism 14. The electrical box 15 is fixedly mounted on the main frame 2 and on one side of the planting mechanism 16. The seedling guiding device 13 is located above the planting mechanism 16. The dispersing device 17 is fixedly mounted on the main frame 2 and at an upper part of the seedling guiding device 13. The power generator 12 and the air compressor 11 are fixedly mounted on left and right sides of a middle part of the crawler-type walking chassis 10, respectively. The plug tray recovery device 5 is fixedly mounted on the main frame 2 and at an upper part of the power generator 12 and the air compressor 11. The box moving device 4 is fixedly mounted on the main frame 2 and at an upper part of the plug tray recovery device 5 to feed a plug tray. The seedling taking and throwing mechanism 1 is fixedly mounted on the main frame 2 and above the box moving device 4. A door-type plug tray frame 3 is fixedly mounted at a middle part and a rear part of the crawler-type walking chassis 10. The walking driving motor 8, the speed reducer 9, and the console 6 are fixedly mounted on the main frame 2 in sequence from front to back inside the door-shaped plug tray frame 3. The seat 7 is fixedly mounted at a rearmost end of the crawler-type walking chassis 10.

Figure 6:
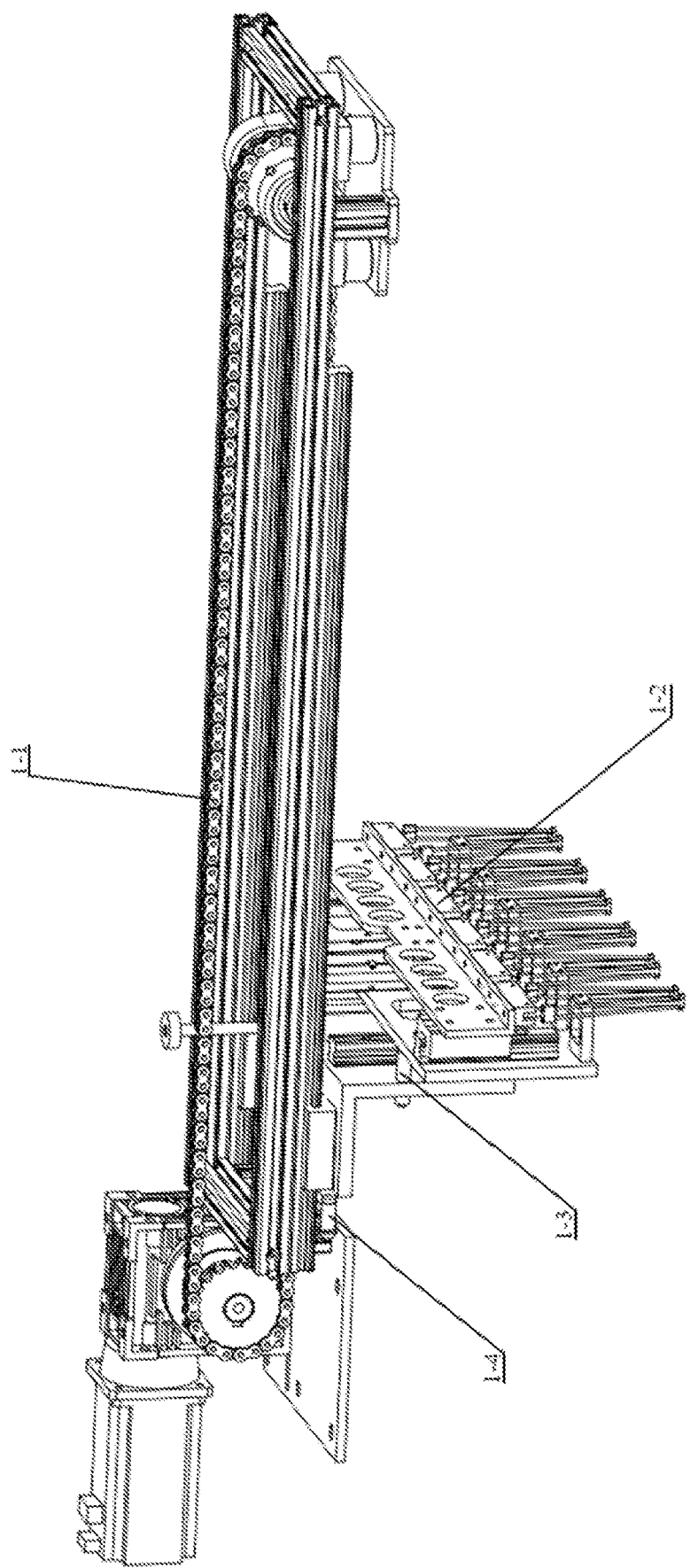
FIG. 6 is a perspective view of a seedling taking and throwing mechanism according to the present disclosure.

As shown in FIG. 6, the dispersing device 17 is located on one side of the box moving device 4. The seedling taking and throwing mechanism 1 includes a seedling taking and throwing movement mechanism 1-2 and a chain transmission mechanism 1-1. The chain transmission mechanism 1-1 is arranged above the box moving device 4, and the seedling taking and throwing movement mechanism 1-2 is configured to reciprocate between the dispersing device 17 and the box moving device 4 through the chain transmission mechanism 1-1. The dispersing device 17 is connected to the seedling guiding device 13, and the planting mechanism 16 is located at a bottom of the seedling guiding device 13 and is configured to transplant a plug seedling. The soil covering mechanism 14 is mounted on the crawler-type walking chassis 10, and the soil covering mechanism 14 is located behind the planting mechanism 16 to cover soil on the planted plug seedling.

Figure 7:
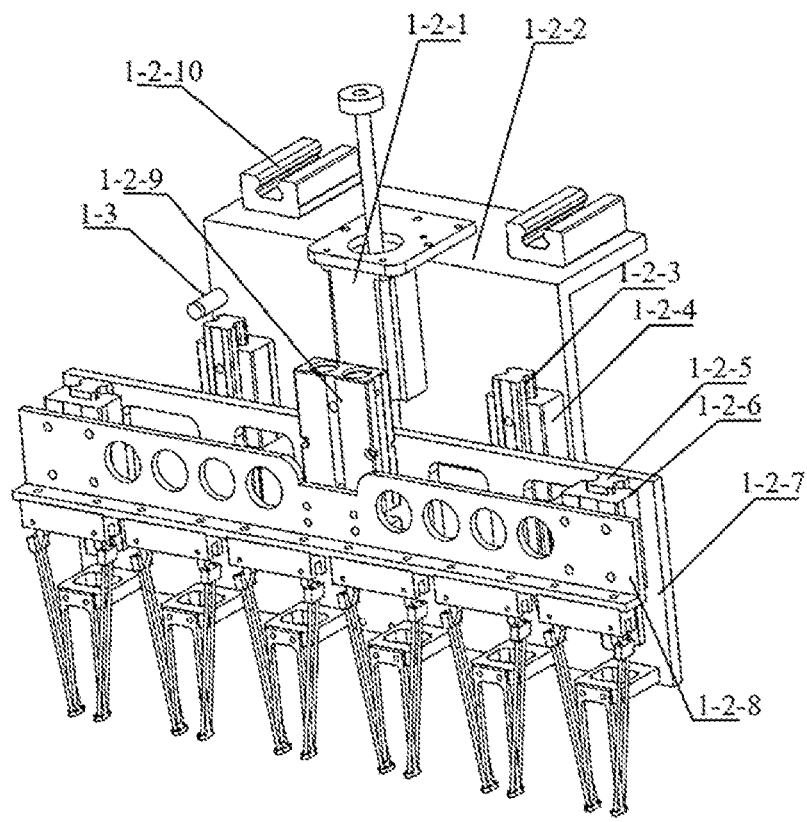
FIG. 7 is a perspective view of a seedling taking and throwing movement mechanism according to the present disclosure.
Figure 8:
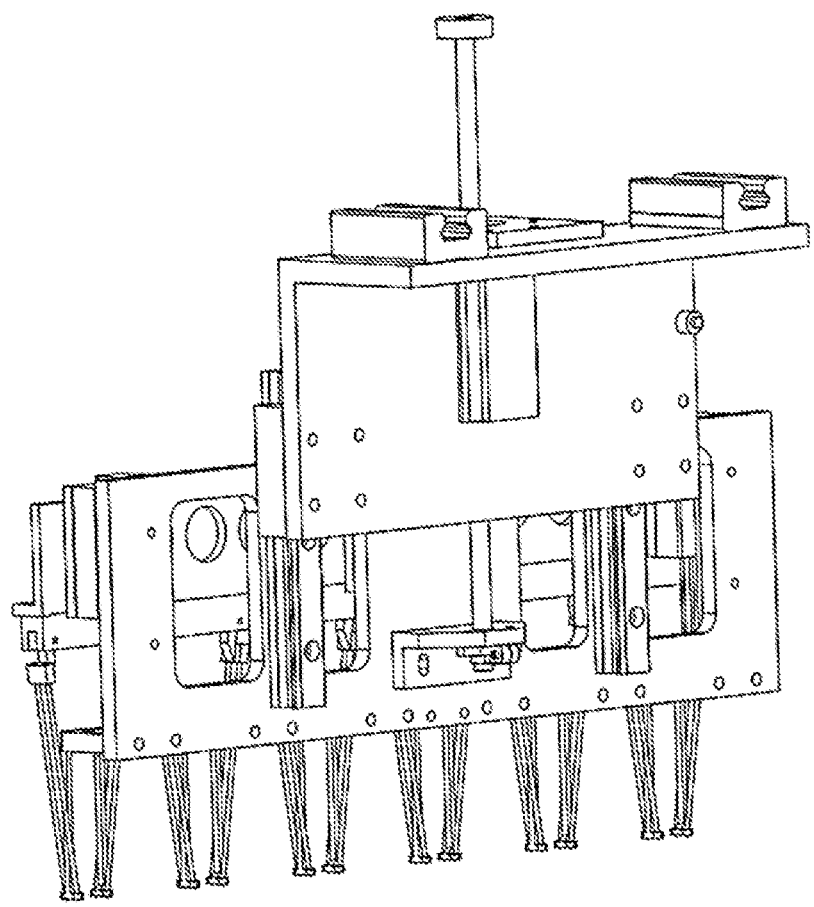
FIG. 8 is a side view of the seedling taking and throwing movement mechanism according to the present disclosure.

As shown in FIG. 7 and FIG. 8, the seedling taking and throwing movement mechanism 1-2 includes a forward-backward movable fixing plate 1-2-2, a seedling taking and throwing movement component 1-2-7, a seedling taking needle movement component 1-2-8, a lead screw motor 1-2-1, and a seedling taking needle movement cylinder 1-2-9. A top of the forward-backward movable fixing plate 1-2-2 is connected to the walking mechanism through a first sliding pair. The forward-backward movable fixing plate 1-2-2 is connected to the seedling taking and throwing movement component 1-2-7 through a second sliding pair, the lead screw motor 1-2-1 is mounted on the forward-backward movable fixing plate 1-2-2, and a push rod of the lead screw motor 1-2-1 is connected to the seedling taking and throwing movement component 1-2-7 to drive the seedling taking and throwing movement component 1-2-7 to move vertically. The seedling taking and throwing movement component 1-2-7 is connected to the seedling taking needle movement component 1-2-8 through a third sliding pair, the seedling taking needle movement cylinder 1-2-9 is mounted on the seedling taking and throwing movement component 1-2-7, and a piston rod of the seedling taking needle movement cylinder 1-2-9 is connected to the seedling taking needle movement component 1-2-8 to drive the seedling taking needle movement component 1-2-8 to move vertically.

Figure 9:
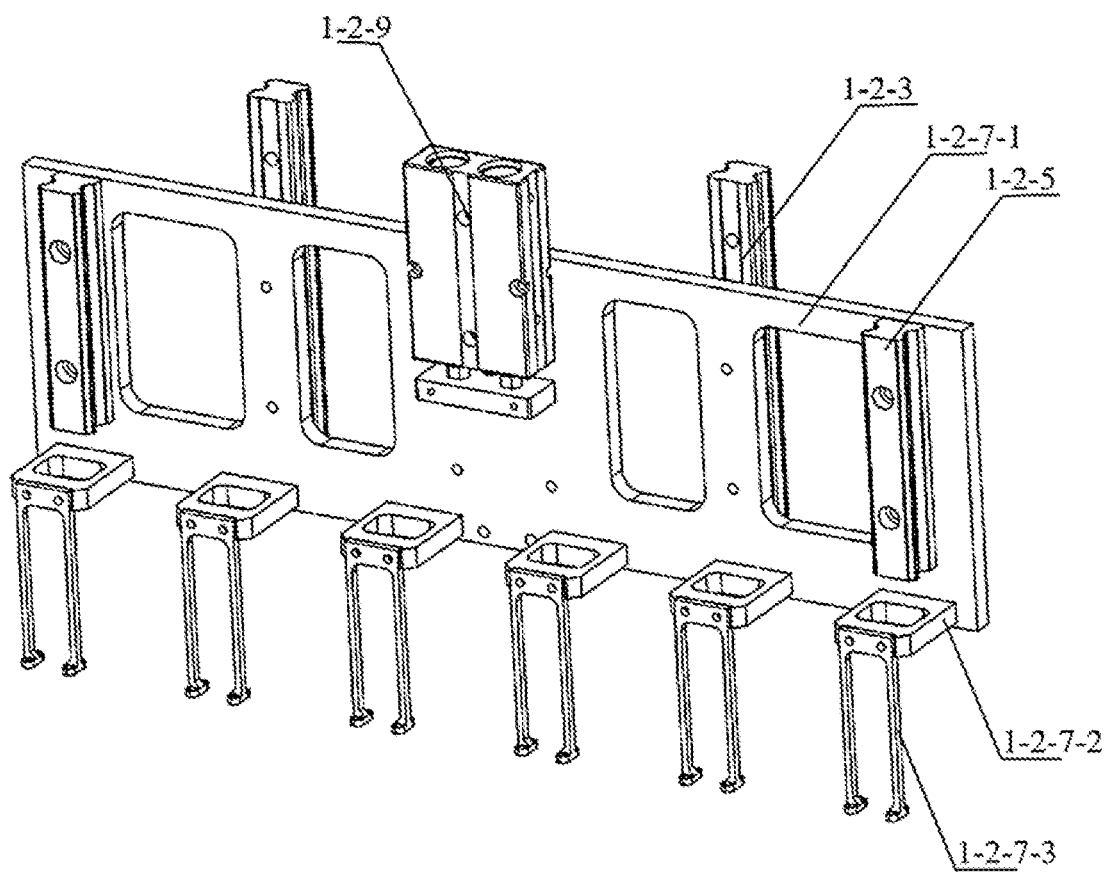
FIG. 9 is a perspective view of a seedling taking and throwing movement component according to the present disclosure.

As shown in FIG. 9, the seedling taking and throwing movement component 1-2-7 includes a seedling taking and throwing movement plate 1-2-7-1, a seedling pushing ring connecting plate 1-2-7-2, and a seedling pushing ring 1-2-7-3. A first guide rail 1-2-3 is mounted on one side surface of the seedling taking and throwing movement plate 1-2-7-1, a first slide block 1-2-4 is mounted on the forward-backward movable fixing plate 1-2-2, and the first slide block 1-2-4 is movably mounted on the first guide rail 1-2-3, so that the seedling taking and throwing movement plate 1-2-7-1 is driven by a lead screw motor 1-2-1 to move vertically. The one side surface of the seedling taking and throwing movement plate 1-2-7-1 is connected to the push rod of the lead screw motor 1-2-1. The seedling taking needle movement cylinder 1-2-9 is mounted on an other side surface of the seedling taking and throwing movement plate 1-2-7-1. One to two seedling pushing ring connecting plates 1-2-7-2 are mounted side by side at a bottom of the other side surface of the seedling taking and throwing movement plate 1-2-7-1, and a seedling pushing ring 1-2-7-3 is mounted on each of the seedling pushing ring connecting plates 1-2-7-2. Two forward-backward movable slide blocks Jan. 2, 2010 are fixedly mounted in parallel on two sides of an upper end surface of the forward-backward movable fixing plate 1-2-2, and are engaged with two parallel forward-backward movable guide rails mounted on a lower end surface of a rectangular frame of the chain transmission mechanism 1-1, so that the forward-backward movable fixing plate 1-2-2 can move forward and backward through the chain transmission mechanism 1-1 under the drive of a driving motor.

Figure 10:
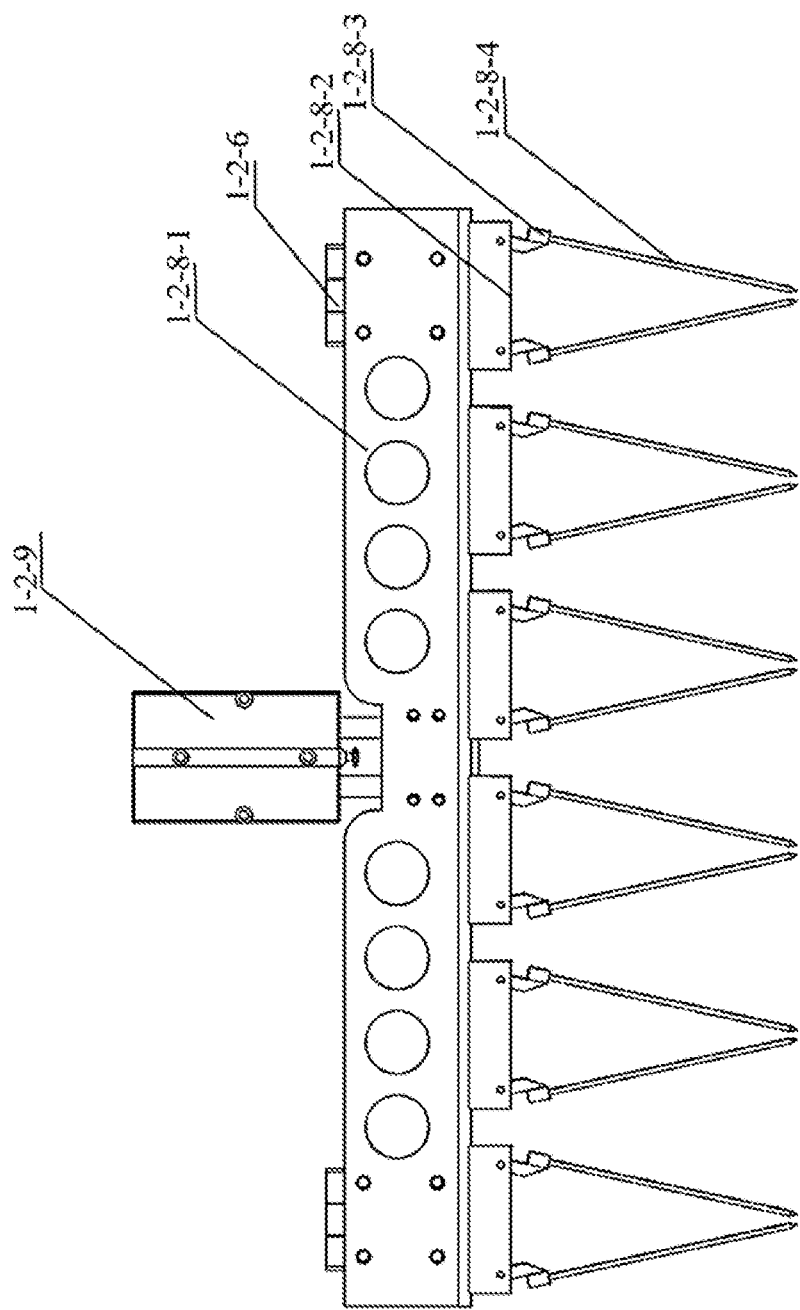
FIG. 10 is a perspective view of a seedling taking needle movement component according to the present disclosure.

As shown in FIG. 10, the seedling taking needle movement component 1-2-8 includes a seedling taking needle movement pressing plate 1-2-8-1, a fixing plate connecting plate 1-2-8-2, a seedling taking needle fixing plate 1-2-8-3, and a seedling taking needle 1-2-8-4. A second slide block 1-2-1-2 is mounted on one side surface of the seedling taking needle movement pressing plate 1-2-8-1, a second guide rail 1-2-5 is mounted on the other side surface of the seedling taking and throwing movement plate 1-2-7-1, and the second slide block 1-2-1-2 is movably mounted on the second guide rail 1-2-5. One side surface of the seedling taking needle movement pressing plate 1-2-8-1 is connected to the piston rod of the seedling taking needle movement cylinder 1-2-9. One to two fixing plate connecting plates 1-2-8-2 are arranged at a bottom of an other side surface of the seedling taking needle movement pressing plate 1-2-8-1, and the fixing plate connecting plates 1-2-8-2 correspond one-to-one to the seedling pushing ring connecting plates 1-2-7-2. Two sides of each of the fixing plate connecting plates 1-2-8-2 are respectively connected to the seedling taking needles 1-2-8-4 through the seedling taking needle fixing plates 1-2-8-3. One end of the seedling taking needle fixing plate 1-2-8-3 is hingedly connected with the fixing plate connecting plate 1-2-8-2 to achieve a movable connection. Every two seedling taking needles 1-2-8-4 form one group. Upper ends of 12 groups of seedling taking needles 1-2-8-4 are mounted on the seedling taking needle fixing plate 1-2-8-3, and lower ends of the seedling taking needles pass through the seedling pushing rings 1-2-7-3. When the seedling taking needle movement component 1-2-8 is raised to a highest position, the ends of the seedling taking needles 1-2-8-4 are in a same horizontal plane as ends of the seedling pushing rings 1-2-7-3.

The seedling taking and throwing vertical position sensor 1-3 is fixedly mounted at an upper left part of the forward-backward movable fixing plate 1-2-2, and is 5 mm away from the seedling taking and throwing movement component 1-2-7 when the seedling taking and throwing movement component 1-2-7 is raised to a position such that an upper end face of the seedling taking and throwing movement plate 1-2-7-1 is flush with an upper end face of the seedling taking and throwing vertical position sensor 1-3. The seedling taking and throwing vertical position sensor 1-3 is configured to detect whether the seedling taking and throwing movement component 1-2-7 reaches a highest initial position. The seedling taking and throwing front-rear position sensor 1-4 is fixedly mounted at a front end of the rectangular frame of the chain transmission mechanism 1-1. When the seedling taking and throwing movement mechanism 1-2 moves to right above the dispersion seedling guiding barrels 17-9 and is 5 mm away from the seedling taking and throwing movement mechanism 1-2, the seedling taking and throwing front-rear position sensor 1-4 is configured to detect whether the seedling taking and throwing movement mechanism 1-2 reaches an initial position for seedling taking and throwing. The control system is configured to respectively control operations of the chain transmission mechanism, the lead screw motor 1-2-1, and the seedling taking needle movement cylinder 1-2-9 according to position information from the seedling taking and throwing vertical position sensor 1-3 and the seedling taking and throwing front-rear position sensor 1-4.

Figure 11:
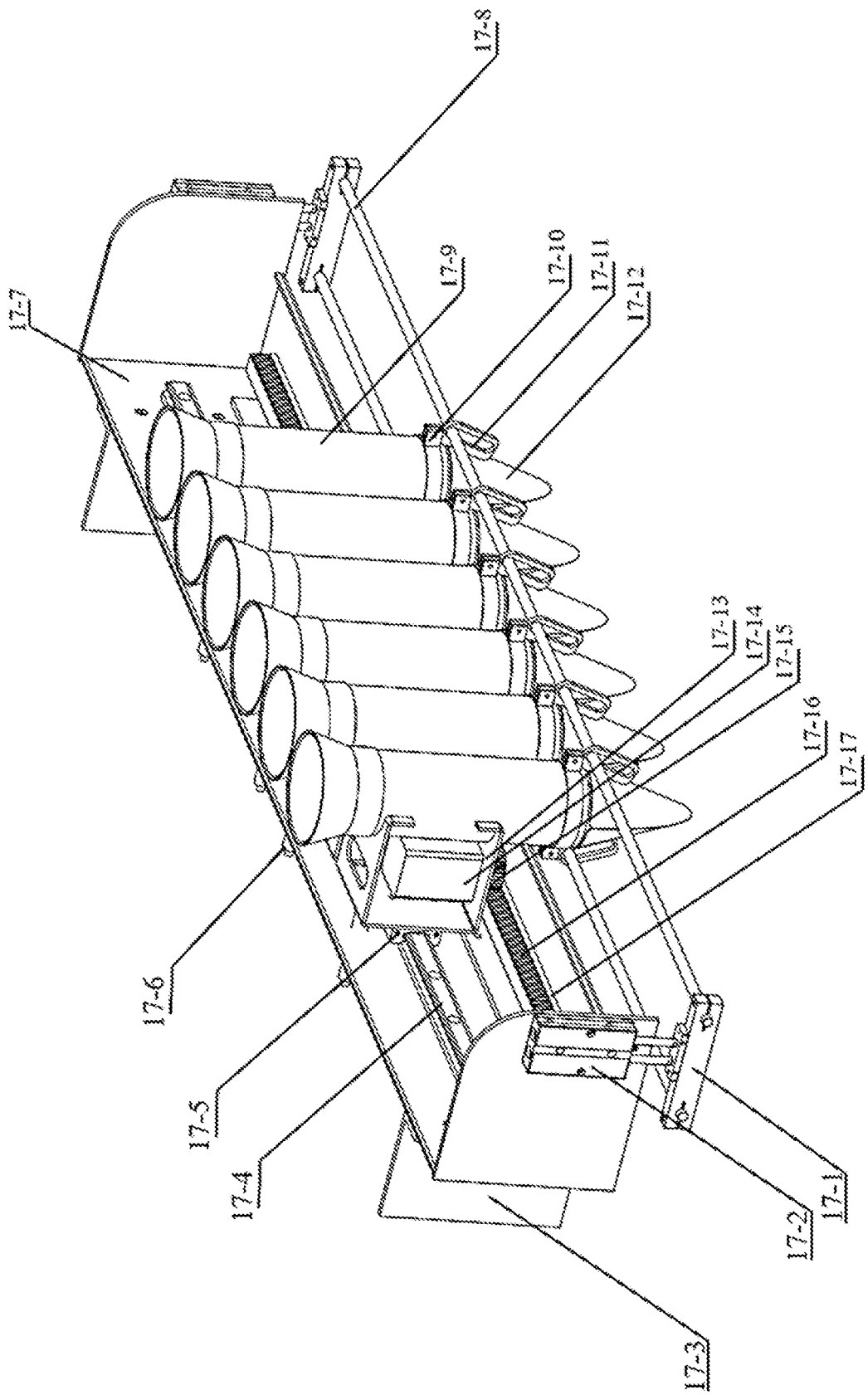
FIG. 11 is a perspective view of a dispersing device according to the present disclosure.
Figure 12:
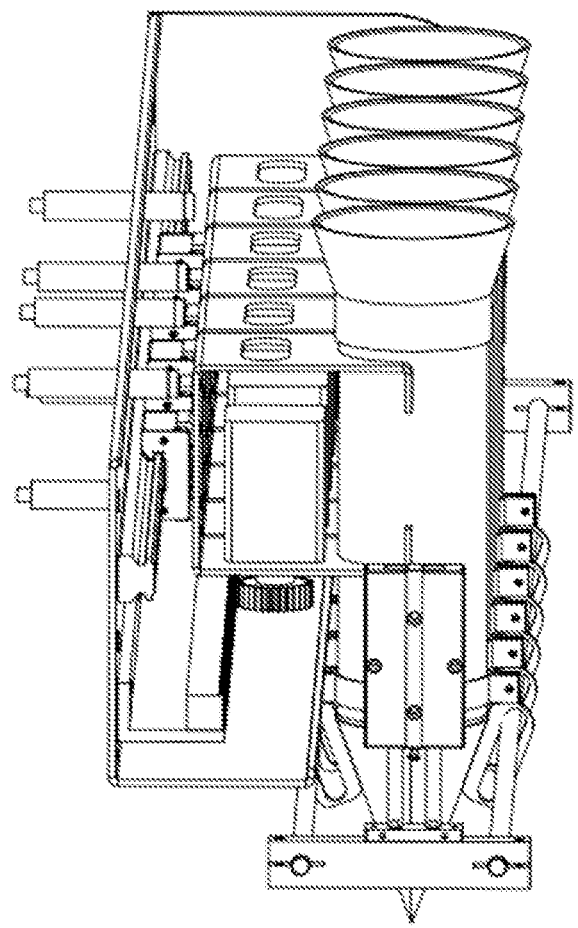
FIG. 12 is a side view of the dispersing device according to the present disclosure.

As shown in FIG. 11 and FIG. 12, the dispersing device 17 includes a mounting frame, a transverse movement guide rail 17-4, a transverse movement slide block 17-5, dispersion seedling guiding barrels 17-9, a dispersing duckbill port 17-12, a C-shaped motor fixing plate 17-13, and a dispersing rack 17-16. The mounting frame is a steel structure formed by a dispersing device fixing connecting plate 17-3 and a dispersing device fixing plate 17-7, and the dispersing device fixing connecting plate 17-3 is connected to the main frame 2. The fixing plate 17-7 of the dispersing device is provided with transverse movement guide rails 17-4, each dispersion seedling guiding barrel 17-9 is connected to transverse movement slide blocks 17-5 through a C-shaped motor fixing plate 17-13, and six transverse movement slide blocks 17-5 are respectively movably mounted on the transverse movement guide rails 17-4. A dispersing motor 17-14 is mounted in the C-shaped motor fixing plate 17-13. The dispersing rack 17-16 is arranged on the dispersing device fixing plate 17-7. The dispersing motor 17-14 is cooperated with the dispersing rack 17-16 through a dispersing gear 17-15 to transversely move the dispersion seedling guiding barrel 17-9. A pair of dispersing duckbill ports 17-12 are arranged at a bottom of each of the dispersion seedling guiding barrels 17-9, and the dispersing duckbill ports 17-12 of a plurality of dispersion seedling guiding barrels 17-9 are synchronously opened or closed by a synchronizing mechanism.

Figure 21:
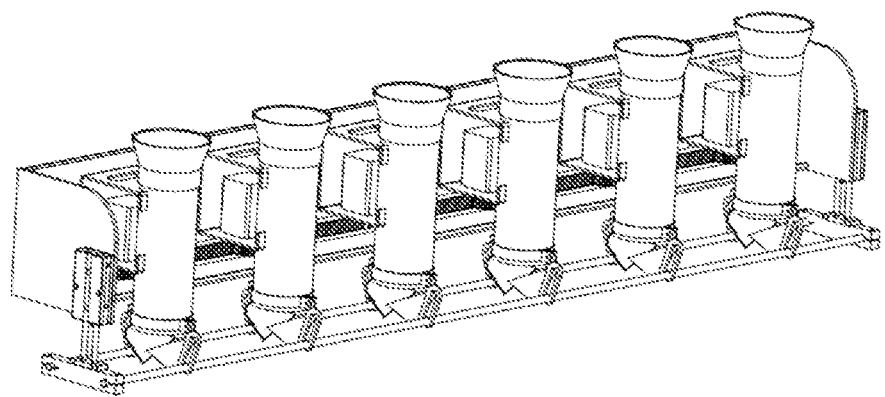
FIG. 21 is a schematic view of the dispersing device in a retracted state according to the present disclosure.
Figure 22:
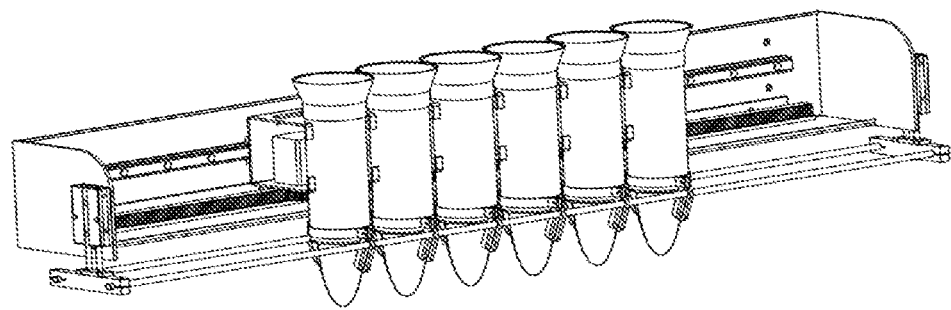
FIG. 22 is a schematic view of the dispersing device in a dispersing state according to the present disclosure.

The synchronization mechanism includes opening/closing cylinder connecting plates 17-1, opening/closing cylinders 17-2, dispersing duckbill port opening/closing rods 17-8, hinge connecting clasp rings 17-10, and dispersing duckbill port opening/closing hinges 17-11. The hinge connecting clasp ring 17-10 is arranged at the bottom of each of the dispersion seedling guiding barrels 17-9, the dispersing duckbill port opening/closing hinge 17-11 is mounted on one end of each of a pair of the dispersing duckbill port 17-12, and one end of each of the dispersing duckbill port opening/closing hinges 17-11 is respectively hingedly connected with the hinge connecting clasp ring 17-10. The opening/closing cylinder 17-2 is mounted on each of two sides of the mounting frame, the opening/closing cylinder connecting plate 17-1 is mounted on a piston rod of each of the opening/closing cylinders 17-2, and every two opening/closing cylinder connecting plates 17-1 are connected by two parallel dispersing duckbill port opening/closing rods 17-8. The two dispersing duckbill port opening/closing rods 17-8 respectively pass through the dispersing duckbill port opening/closing hinges 17-11 on two sides of each hinge connecting clasp ring 17-10, and the opening/closing cylinders 17-2 are controlled to expand or retract to drive the dispersing duckbill port opening/closing rods 17-8 to move vertically, to synchronously open or close the dispersing duckbill ports 17-12 of the plurality of dispersion seedling guiding barrels 17-9, as shown in FIG. 21 and FIG. 22.

In an embodiment, the hinge connecting clasp ring 17-10 is arranged at the bottom of each of the dispersion seedling guiding barrels 17-9, the dispersing duckbill port opening/closing hinge 17-11 is mounted on one end of each of two dispersing duckbill port 17-12, and one end of each of the dispersing duckbill port opening/closing hinges 17-11 is respectively hingedly connected with the hinge connecting clasp ring 17-10. The two parallel dispersing duckbill port opening/closing rods 17-8 respectively pass through the dispersing duckbill port opening/closing hinges 17-11 at front and rear ends and are fixedly mounted on the opening/closing cylinder connecting plates 17-1 at two sides. Push plates of the opening/closing cylinders 17-2 are controlled to stretch and retract to drive the dispersing duckbill port opening/closing rods 17-8 to move vertically, to control the opening/closing of the dispersing duckbill ports 17-12. Six dispersion transverse position sensors 17-6 are mounted at positions corresponding one-to-one to the positions of the dispersion seedling guiding barrels 17-9 in the retracted state, and pass through and are fixedly mounted on a rear end surface of the dispersing device fixing plate 17-7. When coinciding with the dispersion transverse position sensors 17-6, the dispersion seedling guiding barrels 17-9 stop the dispersion retraction movement, to ensure that the dispersion seedling guiding barrels can accurately retracted to the initial position after dispersion. A distance at which the dispersing duckbill ports 17-12 in the dispersing device 17 are distributed is consistent with a center distance of each of the seedling guiding barrels in the seedling guiding device 13, and the center distance of each of the seedling guiding barrels is consistent with a center distance of each of the planting duckbill ports in the planting mechanism 16.

Figure 13:
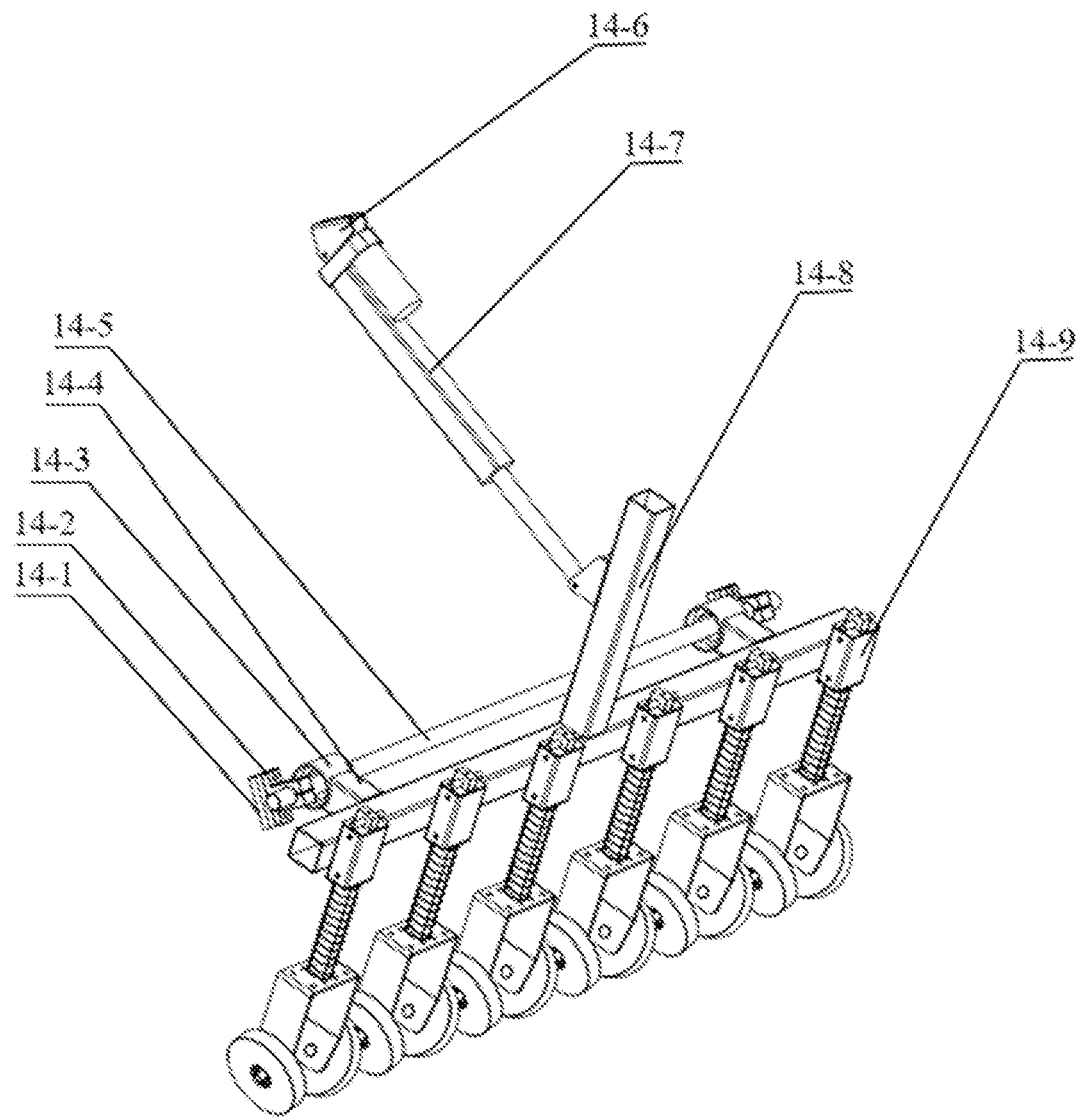
FIG. 13 is a perspective view of a soil covering mechanism according to the present disclosure.
Figure 14:
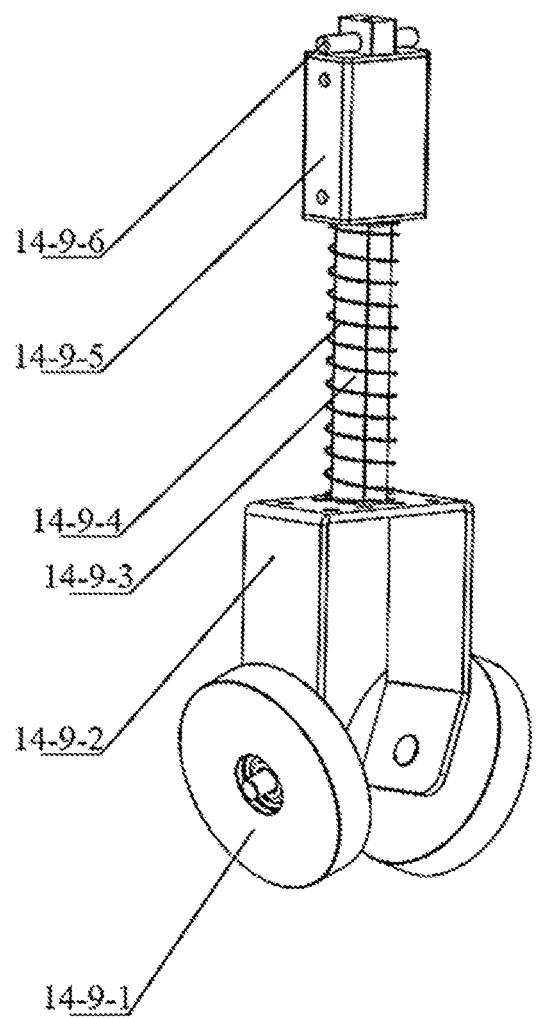
FIG. 14 is a perspective view of a soil covering wheel component according to the present disclosure.

As shown in FIG. 13 and FIG. 14, the soil covering mechanism 14 includes a clamping support connecting plate 14-1, a clamping support 14-2, a circular insert bearing 14-3, a bearing holder connecting rod 14-4, a bare shaft 14-5, an electric push rod bracket 14-6, an electric push rod 14-7, a soil covering mechanism bracket 14-8, and a soil covering wheel component 14-9. The clamping support 14-2 is arranged at two ends of the bare shaft 14-5, and the clamping support 14-2 is connected to the main frame 2 through the clamping support connecting plate 14-1. Two circular insert bearings 14-3 are arranged on the bare shaft 14-5. The circular insert bearings 14-3 are mounted on a lower end of the soil covering mechanism bracket 14-8 through the bearing holder connecting rod 14-4. An upper end of the soil covering mechanism bracket 14-8 is hingedly connected with a lower end of a push rod of the electric push rod 14-7 through the electric push rod connecting bracket 14-6. An upper end of the electric push rod 14-7 is hingedly connected with the main frame 2 through the electric push rod bracket 14-6. A plurality of soil covering wheel components 14-9 are fixedly mounted on the lower end of the soil covering mechanism bracket 14-8 through soil covering wheel guiding blocks 14-9-5.

Each of the soil covering wheel components 14-9 includes soil covering wheels 14-9-1, a U-shaped soil covering wheel fixing plate 14-9-2, a soil covering wheel sliding rod 14-9-3, a soil covering compression spring 14-9-4, a soil covering wheel guiding block 14-9-5, and a positioning pin 14-9-6. Two soil covering wheels 14-9-1 are respectively mounted on two sides of a lower end of the U-shaped soil covering wheel fixing plate 14-9-2. A lower end of the soil covering wheel sliding rod 14-9-3 is fixedly connected to an upper end of the U-shaped soil covering wheel fixing plate 14-9-2. The soil covering wheel guiding block 14-9-5 is movably mounted on the soil covering wheel sliding rod 14-9-3. The positioning pin 14-9-6 is arranged on an upper end of the soil covering wheel sliding rod 14-9-3 to limit movement of the soil covering wheel guiding block 14-9-5. The soil covering compression spring 14-9-4 is mounted on the soil covering wheel sliding rod 14-9-3. A lower end of the soil covering compression spring 14-9-4 in a static state is in contact with the upper end of the U-shaped soil covering wheel fixing plate 14-9-2. An upper end of the soil covering compression spring 14-9-4 is in contact with a lower end surface of the soil covering wheel guiding block 14-9-5. An upper end of the soil covering wheel guiding block 14-9-5 is in contact with a lower end of the positioning pin 14-9-6. A telescopic length of the electric push rod 14-7 is adjusted to allow the soil covering mechanism bracket 14-8 to rotate about the bare shaft 14-5 to drive the soil covering wheel component 14-1 to rotate, to adjust an above-ground height of the soil covering wheel component 14-1. In the case of uneven ridge surface, the soil covering wheel can overcome the pressure of the soil covering compression spring 14-9-4 in the working process and move vertically along the soil covering wheel sliding rod 14-9-3 in a certain range for a soil covering operation.

The present disclosure provides a planting control method of the self-propelled full-automatic dense-planting vegetable transplanter, which includes the following steps.

Figure 15:
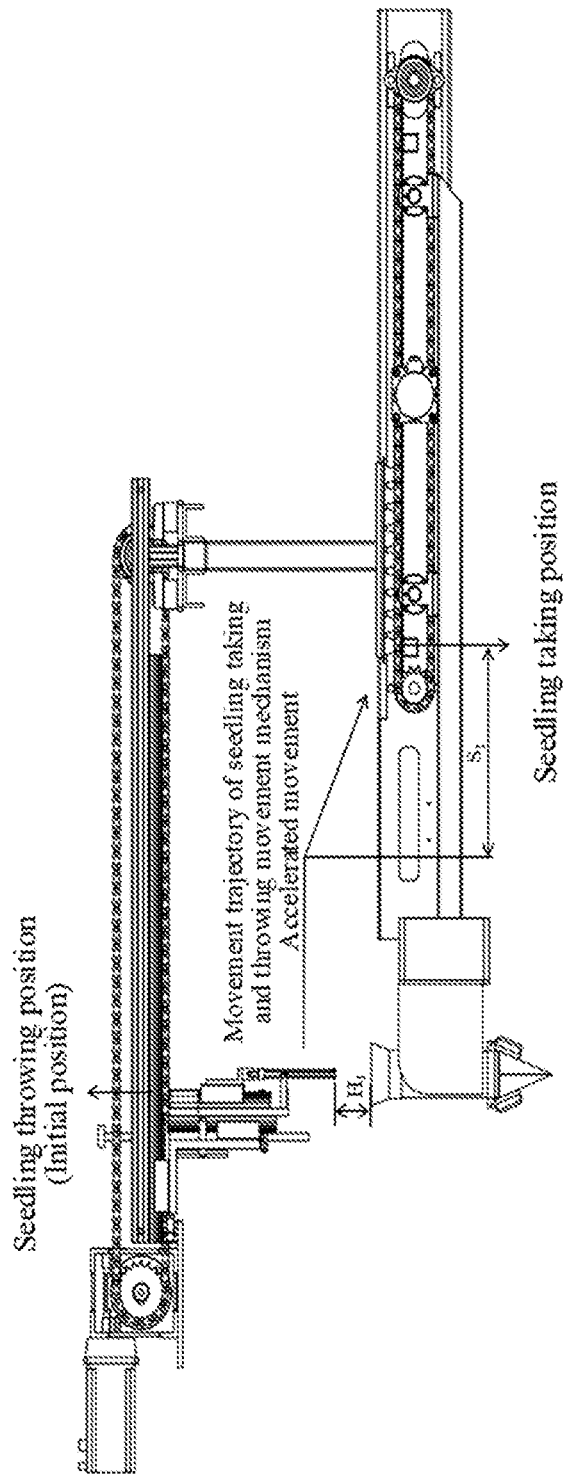
FIG. 15 is a schematic view of the seedling taking and throwing movement mechanism at an initial position relative to a plug tray according to the present disclosure.

In S01, the seedling taking and throwing movement mechanism 1-2 is reset to the initial position. The control system controls the driving motor to operate, and the driving motor controls the chain transmission mechanism to allow the forward-backward movable fixing plate 1-2-2 to move toward the dispersing device 17 through the forward-backward movable guide rail and slide block mechanism, so that the seedling taking and throwing movement mechanism 1-2 moves toward the dispersing device 17. When the seedling taking and throwing movement mechanism 1-2 moves to right above the dispersion seedling guiding barrels 17-9 of the dispersing device 17, the seedling taking front-rear position sensor 1-4 detects that the seedling taking and throwing movement mechanism 1-2 has reached the initial position (seedling throwing position), and the control system controls the driving motor to stop operating. At the same time, the control system controls the lead screw motor 1-2-1 to operate, and controls the seedling taking and throwing movement component 1-2-7 to move upward through the seedling-taking vertical guide rail and slide block mechanism to a position at which a height from the end of the seedling taking needle 1-2-8-4 to an upper end surface of the dispersion seedling guiding barrel 17-9 is H1 (i.e., the seedling taking and throwing movement component 1-2-7 is at the highest position). The seedling taking and throwing vertical position sensor 1-3 detects that the seedling taking and throwing movement component 1-2-7 has reached the initial position, and the control system controls the lead screw motor 1-2-1 to stop operating. At this time, the seedling taking and throwing movement mechanism 1-2 moves to the initial position, as shown in FIG. 15. In an embodiment, H1 is 20 mm.

In S02, after the resetting is completed, the plug tray is removed from the plug tray frame 3 and placed on the box moving device 4. The box moving device 4 starts to operate, and accurately transports the plug tray to the seedling taking position. After the plug tray reaches the seedling taking position, when the seedling taking and throwing vertical position sensor 1-3 and the seedling taking front-rear position sensor 1-4 have detected that the seedling taking and throwing movement mechanism 1-2 is already at the initial position, the control system controls the driving motor to operate, and the driving motor controls the chain transmission mechanism 1-1 to allow the forward-backward movable fixing plate 1-2-2 to accelerate and move toward the seedling taking position (a center of cells of a row of seedlings to be taken from the plug tray) through the forward-backward movable guide rail and slide block mechanism, so that the seedling taking and throwing movement mechanism 1-2 accelerates and moves to a distance S1 which is half of a distance between the seedling taking position and seedling throwing position, the control system controls the lead screw motor 1-2-1 to operate and controls the seedling taking and throwing movement component 1-2-7 to move downward, as shown in FIG. 15.

Figure 16:
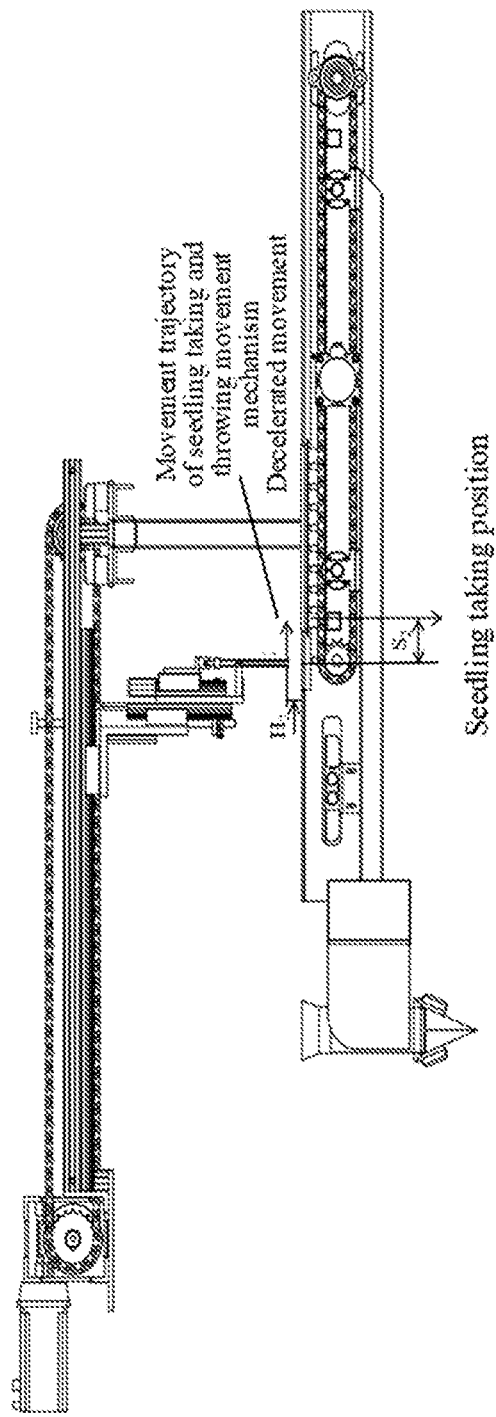
FIG. 16 is a schematic view of the seedling taking and throwing movement mechanism moving toward the plug tray according to the present disclosure.

In S03, when the seedling taking and throwing movement mechanism 1-2 accelerates and moves to a position at a distance of S2 from the seedling taking position, and the seedling taking and throwing movement component 1-2-7 is lowered to a position at which a height from the end of the seedling taking needle 1-2-8-4 to an upper end surface of the plug tray is H2, the control system controls the lead screw motor 1-2-1 to stop operating, so that the seedling taking and throwing movement component 1-2-7 keeps relatively stationary. The control system controls the driving motor to allow the seedling taking and throwing movement mechanism 1-2 to decelerate and translate toward the seedling taking position. As shown in FIG. 16, in an embodiment, S2 is 20 mm, and H2 is 5 mm.

Figure 17:
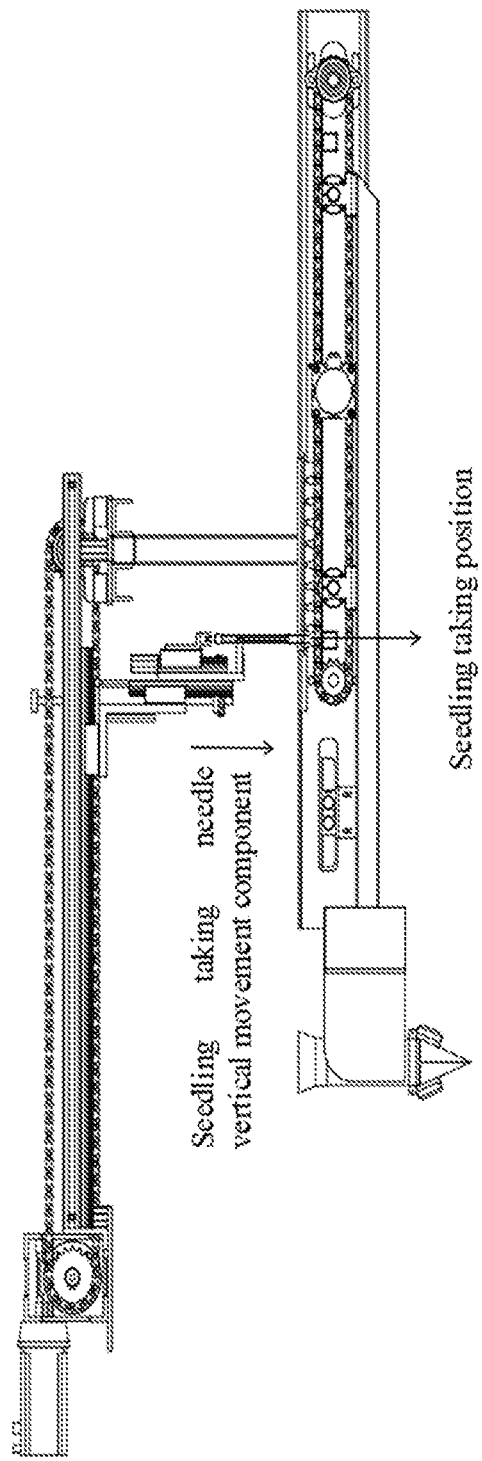
FIG. 17 is a schematic view of the seedling taking and throwing movement mechanism moving downward for seedling taking according to the present disclosure.

In S04, after the seedling taking and throwing movement mechanism 1-2 decelerates and translates until it stops at the seedling taking position, the control system controls the seedling taking needle movement cylinder 1-2-9 to push out the piston downward, to drive the seedling taking needle movement component 1-2-8 to move downward, so that the seedling taking needles 1-2-8-4 are inserted into plug seedlings for seedling taking, as shown in FIG. 17.

Figure 18:
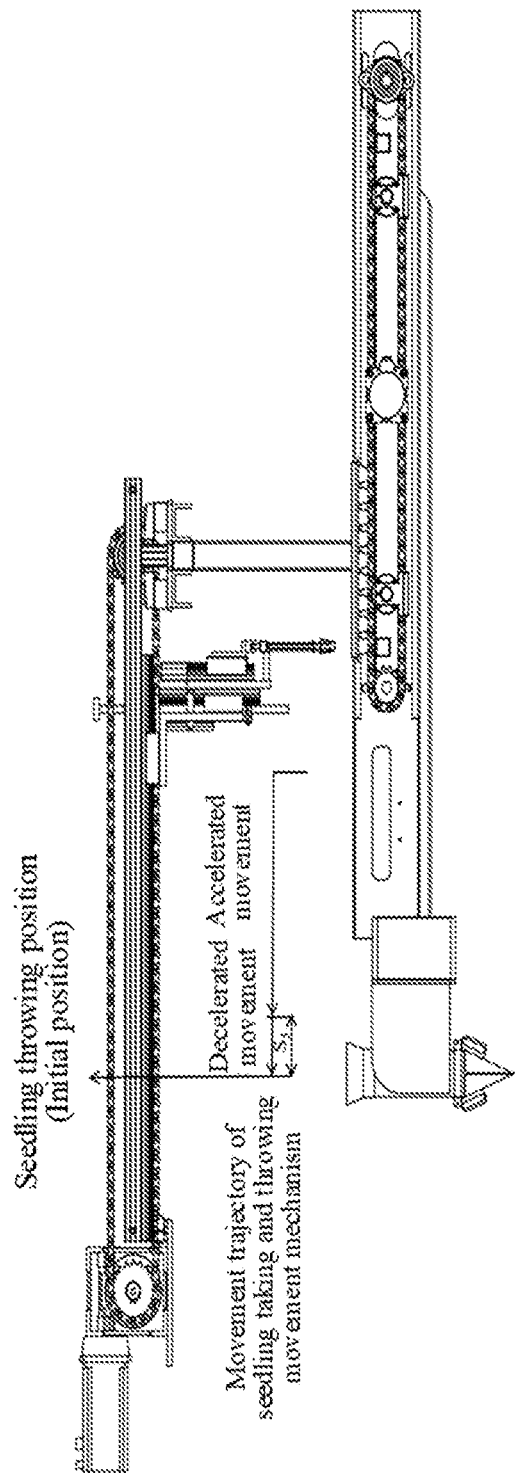
FIG. 18 is a schematic view of the seedling taking and throwing movement mechanism moving upward after seedling taking according to the present disclosure.

In S05, the control system controls the lead screw motor 1-2-1 to operate, and controls the seedling taking and throwing movement component 1-2-7 to move upward to the highest position. In this case, the seedling taking and throwing vertical position sensor 1-3 detects that the seedling taking and throwing movement component 1-2-7 has reached the highest position. The control system controls the driving motor to operate. The driving motor controls the chain transmission mechanism 1-1 to allow the forward-backward movable fixing plate 1-2-2 to accelerate and move toward right above the dispersion seedling guiding barrels 17-9 of the dispersing device 17 (toward the seedling throwing position), so that the seedling taking and throwing movement mechanism 1-2 accelerates and moves toward right above the dispersion seedling guiding barrels 17-9 of the dispersing device 17, as shown in FIG. 18.

Figure 19:
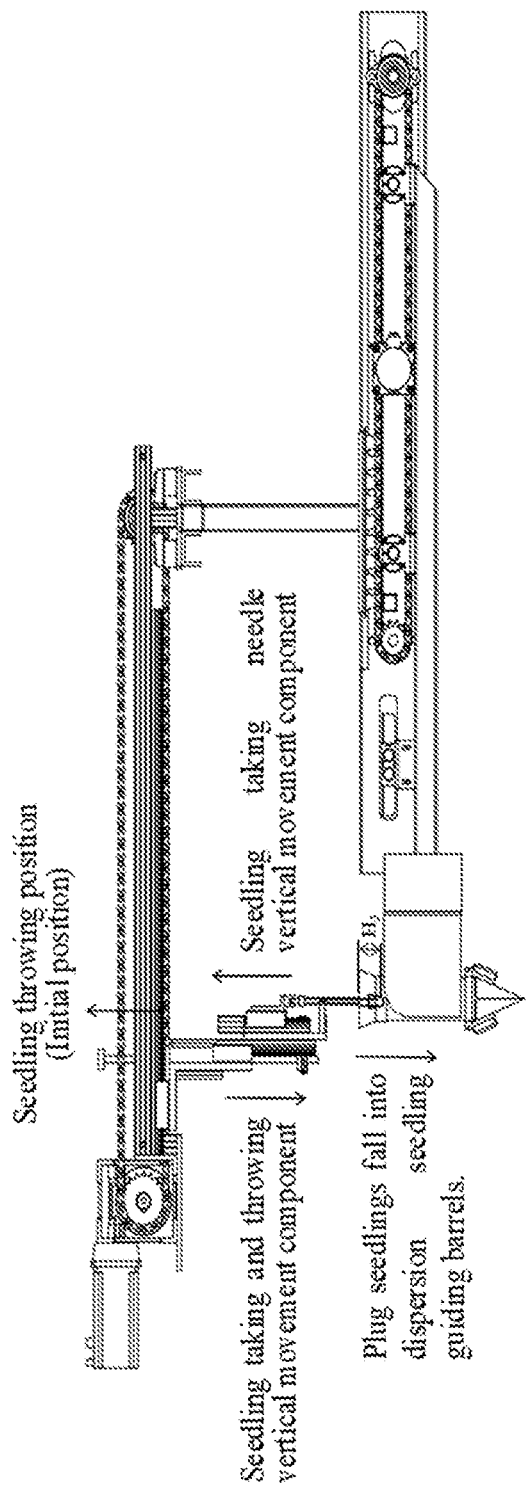
FIG. 19 is a schematic view of the seedling taking and throwing movement mechanism moving downward for seedling throwing according to the present disclosure.

In S06, when the seedling taking and throwing movement mechanism 1-2 accelerates and moves to a position that is at a distance of S3 from the dispersion seedling guiding barrels 17-9 of the dispersing device 17, the seedling taking and throwing movement mechanism 1-2 decelerates until it moves to right above the dispersion seedling guiding barrels 17-9 of the dispersing device 17. The seedling taking and throwing front-rear position sensor 1-4 detects that the seedling taking and throwing movement mechanism 1-2 reaches the seedling throwing position. The control system controls the lead screw motor 1-2-1 to operate, to control the seedling taking and throwing movement component 1-2-7 to move downward until the overall height of the seedling penetrates into two-thirds of the dispersion seedling guiding barrels 17-9, i.e., the distance from the bottom of the seedling to the upper end surface of the dispersion seedling guiding barrel 17-9 is H3. At the same time, the control system controls the seedling taking needle movement cylinder 1-2-9 to retract the piston upward, to drive the seedling taking needle movement component 1-2-8 to move upward, so that the seedling taking needles 1-2-8-4 retract upward, and the plug seedlings are pushed into the dispersion seedling guiding barrels 17-9 by the seedling pushing rings 1-2-7-3, as shown in FIG. 19. In an embodiment, S3 is 20 mm.

Figure 20:
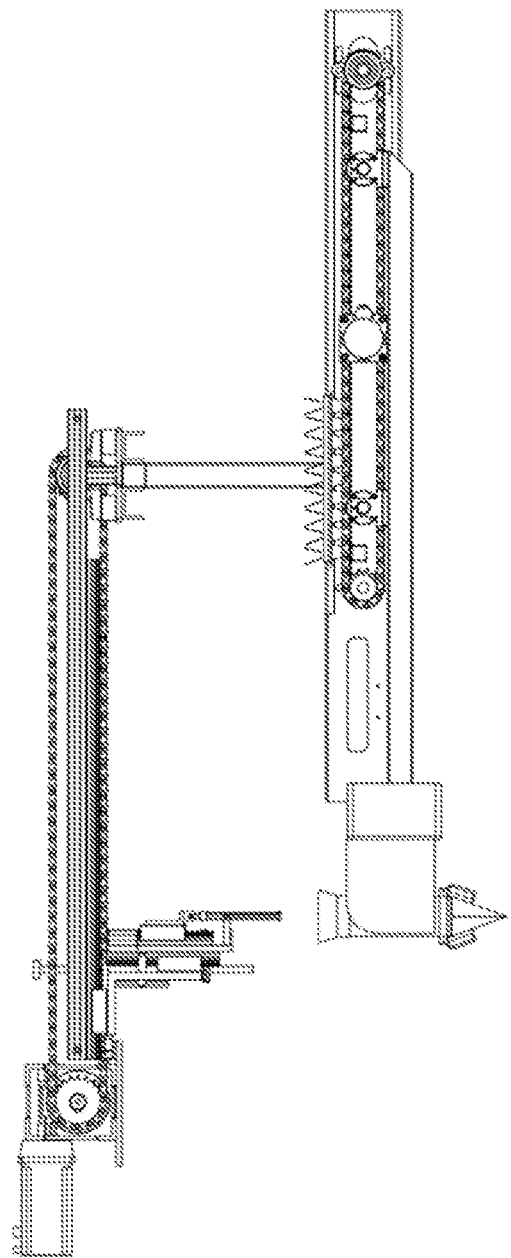
FIG. 20 is a schematic view of resetting of the seedling taking and throwing movement mechanism according to the present disclosure.

In S07, the control system controls the lead screw motor 1-2-1 to operate, to control the seedling taking and throwing movement component 1-2-7 to move upward. When the seedling taking and throwing movement component 1-2-7 moves to the highest point, the seedling taking and throwing vertical position sensor 1-3 detects that the seedling taking and throwing movement component 1-2-7 reaches the highest position, i.e., the seedling taking and throwing movement mechanism 1-2 moves to the initial position, as shown in FIG. 20.

In S08, after the plug seedlings fall into the dispersing device 17, the dispersing device 17 starts to operate. After the seedlings fall into the dispersing duckbill ports 17-12 along the dispersion seedling guiding barrels 17-9, the dispersing motor 17-14 starts to operate, to drive the dispersing gear 17-15 to move leftward or rightward along the dispersing rack 17-16, to drive the six dispersion seedling guiding barrels 17-9 to be distributed to the left and right sides. After left and right limit positions are reached, the opening/closing cylinders 17-2 start to operate, and the cylinder piston rod pushes the opening/closing cylinder connecting plate 17-1 to move downward, so that the dispersing duckbill port opening/closing rod 17-8 moves downward along the dispersing duckbill port opening/closing hinge 17-11, to open the dispersing duckbill ports, as shown in FIG. 21. The plug seedlings fall into the planting duckbill ports of the planting mechanism 16 along the seedling guiding device 13, and then the piston rod of the opening/closing cylinder 17-2 retracts upward, so that the dispersing duckbill ports are closed. At the same time, the dispersion seedling guiding barrels 17-9 move in a reverse direction to retract. When coinciding with the dispersion transverse position sensors 17-6, the dispersion seedling guiding barrels 17-9 stop the dispersion retraction movement, and return to the initial position, as shown in FIG. 22.

In S09, after the plug seedlings fall into the planting duckbill ports of the planting mechanism 16, the planting mechanism 16 is caused to move downward vertically, the planting duckbill ports at are opened a lowest position, the plug seedlings are planted into ground, then the planting mechanism is caused to move upward to an initial position, and the planting duckbill ports are closed. After the planting is completed, the soil covering mechanism 14 moves along with the entire transplanter to perform a soil covering operation on the newly planted plug seedlings, thus completing one planting cycle.

In S10, each time the planting cycle is completed, the box moving device 4 moves to accurately convey the seedlings in the plug tray that have not been transplanted to the seedling taking position, to start the next planting cycle, until all seedlings in the plug tray have been planted.

In S11, when all seedlings in the plug tray have been planted, the plug tray is moved forward along the box moving device 4 to fall onto the plug tray recovery mechanism 5, the plug tray recovery mechanism 5 transports the plug tray to the rear to be taken away manually, and the next planting cycle is started.

In an embodiment, according to the present disclosure, when the seedling taking and throwing movement mechanism 1-2 accelerates and moves to a position that is 20 mm away from the seedling taking position, the seedling taking and throwing movement component 1-2-7 is controlled to descend to a position at which the end of the seedling taking needle 1-2-8-4 is 5 mm above the top of the plug tray, and then decelerate and translate to the seedling taking position. After reaching the seedling taking position, the seedling taking needle 1-2-8-4 is inserted downward into the plug to clamp the seedling. The seedling taking needle provides a function of combing the plug seedlings before being inserted into the plug to separate interlaced leaves of adjacent plug seedlings, to effectively solve the problems of seedling leaf damage and seedling entrainment caused by the insertion of the seedling taking needles 1-2-8-4 from right above seedlings to take the seedlings, reduce damage to plug seedlings, ensure the integrity of plug seedlings, and increase the success rate of seedling taking, thereby ensuring the success rate of planting. The seedling taking and throwing movement component 1-2-7 is controlled to move downward until an overall height of a seedling penetrates into two-thirds of the dispersion seedling guiding barrels 17-9, i.e., a distance from the bottom of the seedling and the upper end surface of the dispersion seedling guiding barrel 17-9 is H3. At the same time, the seedling taking needle movement component 1-2-8 moves upward. In this way, when the entire seedling taking and throwing movement component 1-2-7 in the seedling throwing barrel moves downward, the seedling taking needle 1-2-8 retracts upward, and the seedling pushing ring 1-2-7-3 pushes the seedling downward, to effectively solve the problem of the plug seedling hanging to the seedling throwing barrel caused by the seedling pushing ring 1-2-7-3 directly pushing the seedling downward from above the seedling throwing barrel in the prior art, thereby reducing seedling hanging, improving the success rate of seedling throwing, and ensuring the success rate of planting.

It should be understood that although this specification is described in accordance with various embodiments, it does not mean that each embodiment only contains an independent technical solution. The description in the specification is only for clarity, and those skilled in the art should regard the specification as a whole, and the technical solutions in the embodiments can also be appropriately combined to form other implementations that can be understood by those skilled in the art.

The detailed descriptions listed above are merely specific illustrations of feasible embodiments of the present disclosure, and the protection scope of the present disclosure is not limited thereto. Equivalent embodiments or changes can be made without departing from the technical spirit of the present disclosure, which are all embraced in the protection scope of the present disclosure.

What is claimed is:

1. A self-propelled full-automatic dense-planting vegetable transplanter, comprising a seedling taking and throwing mechanism, a box moving device, a crawler-type walking chassis, a seedling guiding device, a soil covering mechanism, a planting mechanism, and a dispersing device, wherein the box moving device is mounted on the crawler-type walking chassis to feed a plug tray; the dispersing device is located on one side of the box moving device; the seedling taking and throwing mechanism comprises a seedling taking and throwing movement mechanism and a linear movement mechanism; the linear movement mechanism is arranged above the box moving device, and the seedling taking and throwing movement mechanism is configured to reciprocate between the dispersing device and the box moving device through the linear movement mechanism; the dispersing device is connected to the seedling guiding device, and the planting mechanism is located at a bottom of the seedling guiding device and is configured to transplant plug seedlings; the soil covering mechanism is mounted on the crawler-type walking chassis, and the soil covering mechanism is located behind the planting mechanism to cover soil on plug seedlings that are planted;

the seedling taking and throwing movement mechanism comprises a forward-backward movable fixing plate, a seedling taking and throwing movement component, a seedling taking needle movement component, a lead screw motor, and a seedling taking needle movement cylinder; a top of the forward-backward movable fixing plate is connected to the linear movement mechanism through a first sliding pair; the forward-backward movable fixing plate is connected to the seedling taking and throwing movement component through a second sliding pair, the lead screw motor is mounted on the forward-backward movable fixing plate, and a push rod of the lead screw motor is connected to the seedling taking and throwing movement component to drive the seedling taking and throwing movement component to move vertically; the seedling taking and throwing movement component is connected to the seedling taking needle movement component through a third sliding pair, the seedling taking needle movement cylinder is mounted on the seedling taking and throwing movement component, and a piston rod of the seedling taking needle movement cylinder is connected to the seedling taking needle movement component to drive the seedling taking needle movement component to move vertically;

the seedling taking and throwing movement component comprises a seedling taking and throwing movement plate, seedling pushing ring connecting plates, and seedling pushing rings; a first guide rail is mounted on one side surface of the seedling taking and throwing movement plate, a first slide block is mounted on the forward-backward movable fixing plate, and the first slide block is movably mounted on the first guide rail; the one side surface of the seedling taking and throwing movement plate is connected to the push rod of the lead screw motor; the seedling taking needle movement cylinder is mounted on an other side surface of the seedling taking and throwing movement plate; a plurality of the seedling pushing ring connecting plates are mounted at a bottom of the other side surface of the seedling taking and throwing movement plate, and the seedling pushing rings are respectively mounted on the seedling pushing ring connecting plates;

the seedling taking needle movement component comprises a seedling taking needle movement pressing plate, fixing plate connecting plates, seedling taking needle fixing plates, and seedling taking needles; a second slide block is mounted on one side surface of the seedling taking needle movement pressing plate, a second guide rail is mounted on the other side surface of the seedling taking and throwing movement plate, and the second slide block is movably mounted on the second guide rail; the one side surface of the seedling taking needle movement pressing plate is connected to the piston rod of the seedling taking needle movement cylinder; a plurality of the fixing plate connecting plates are arranged at a bottom of an other side surface of the seedling taking needle movement pressing plate, and the fixing plate connecting plates correspond one-to-one to the seedling pushing ring connecting plates; and two sides of the fixing plate connecting plates are respectively connected to the seedling taking needles through the seedling taking needle fixing plates.

2. The self-propelled full-automatic dense-planting vegetable transplanter according to claim 1, wherein one end of each of the seedling taking needle fixing plates is hingedly connected with a corresponding one of the fixing plate connecting plates, ends of the seedling taking needles on the fixing plate connecting plates respectively pass through the seedling pushing rings, and when the seedling taking needle fixing plates are raised to a highest position, the ends of the seedling taking needles are in a same horizontal plane as ends of the seedling pushing rings.

3. The self-propelled full-automatic dense-planting vegetable transplanter according to claim 1, wherein the dispersing device comprises a mounting frame, a transverse movement guide rail, transverse movement slide blocks, dispersion seedling guiding barrels, dispersing duckbill ports, a C-shaped motor fixing plate, and a dispersing rack; the transverse movement guide rail is arranged on the mounting frame, the dispersion seedling guiding barrels are respectively connected to the transverse movement slide blocks through the C-shaped motor fixing plate, and a plurality of the transverse movement slide blocks are movably mounted on the transverse movement guide rail; a driving unit is mounted in the C-shaped motor fixing plate, the dispersing rack is arranged on the mounting frame, and the driving unit is cooperated with the dispersing rack through a transmission unit to drive the dispersion seedling guiding barrels to move transversely; and a pair of the dispersing duckbill ports are arranged at a bottom of each of the dispersion seedling guiding barrels, and the dispersing duckbill ports of a plurality of the dispersion seedling guiding barrels are synchronously opened or closed by a synchronizing mechanism.

4. The self-propelled full-automatic dense-planting vegetable transplanter according to claim 3, wherein the synchronization mechanism comprises opening/closing cylinder connecting plates, opening/closing cylinders, dispersing duckbill port opening/closing rods, a hinge connecting clasp ring, and a dispersing duckbill port opening/closing hinge; the hinge connecting clasp ring is arranged at the bottom of each of the dispersion seedling guiding barrels, the dispersing duckbill port opening/closing hinge is mounted on one end of each of the pair of the dispersing duckbill ports, and one end of the dispersing duckbill port opening/closing hinge is hingedly connected with the hinge connecting clasp ring; the opening/closing cylinders are mounted respectively on two sides of the mounting frame, a piston rod of each of the opening/closing cylinders is provided with a corresponding one of the opening/closing cylinder connecting plates, and two of the opening/closing cylinder connecting plates are connected by two parallel dispersing duckbill port opening/closing rods; and the two dispersing duckbill port opening/closing rods respectively pass through the dispersing duckbill port opening/closing hinge on two sides of the hinge connecting clasp ring, and the opening/closing cylinders are controlled to expand or retract to drive the dispersing duckbill port opening/closing rods to move vertically, to synchronously open or close the dispersing duckbill ports of the plurality of the dispersion seedling guiding barrels.

5. The self-propelled full-automatic dense-planting vegetable transplanter according to claim 1, wherein the soil covering mechanism comprises soil covering wheel components, a clamping support, a bare shaft, a soil covering mechanism bracket, and an electric push rod; two ends of the bare shaft each are provided with the clamping support, and the clamping support is connected to the crawler-type walking chassis through a main frame; a lower end of the soil covering mechanism bracket is supported on the bare shaft, an upper end of the soil covering mechanism bracket is hingedly connected with one end of a push rod of the electric push rod, and a base of the electric push rod is mounted on the main frame; a plurality of the soil covering wheel components are arranged at the lower end of the soil covering mechanism bracket (14-8), and a telescopic length of the electric push rod is adjusted to adjust an above-ground height of the soil covering wheel components;

each of the soil covering wheel components comprises a soil covering wheel, a U-shaped soil covering wheel fixing plate, a soil covering wheel sliding rod, a soil covering compression spring, a soil covering wheel guiding block, and a positioning pin; the soil covering wheel is mounted on each of two sides of a bottom of the U-shaped soil covering wheel fixing plate, a lower end of the soil covering wheel sliding rod is connected to the U-shaped soil covering wheel fixing plate, the soil covering wheel guiding block is movably mounted on the soil covering wheel sliding rod, and an upper end of the soil covering wheel sliding rod limits a moving position of the soil covering wheel guiding block through the positioning pin; the soil covering wheel guiding block is connected to the soil covering mechanism bracket; and the soil covering compression spring is mounted on the soil covering wheel sliding rod, and the soil covering compression spring is located between the U-shaped soil covering wheel fixing plate and the soil covering wheel guiding block.

6. The self-propelled full-automatic dense-planting vegetable transplanter according to claim 4, further comprising a seedling taking and throwing vertical position sensor, a seedling taking and throwing front-rear position sensor, and a control system, wherein the seedling taking and throwing vertical position sensor is mounted on the forward-backward movable fixing plate to detect whether the seedling taking and throwing movement component reaches a highest initial position; the seedling taking and throwing front-rear position sensor is mounted on a walking mechanism to detect whether the seedling taking and throwing movement mechanism is located above the dispersing device; and the control system is configured to respectively control operations of the walking mechanism, the lead screw motor, and the seedling taking needle movement cylinder according to position information from the seedling taking and throwing vertical position sensor and the seedling taking and throwing front-rear position sensor.

7. The self-propelled full-automatic dense-planting vegetable transplanter according to claim 6, wherein a plurality of dispersion transverse position sensors are arranged on the mounting frame, and mounting positions of the dispersion transverse position sensors correspond one-to-one to positions of the dispersion seedling guiding barrels in a retracted state, to reset the dispersion seedling guiding barrels after dispersion.

8. A planting control method of the self-propelled full-automatic dense-planting vegetable transplanter according to claim 6, comprising:
placing the plug tray on the box moving device; the control system controlling the box moving device to move the plug tray to a seedling taking position;
controlling the walking mechanism by the control system to accelerate the seedling taking and throwing movement mechanism toward the seedling taking position; when the seedling taking and throwing movement mechanism moves to a set distance S1, controlling the lead screw motor by the control system to lower the seedling taking and throwing movement component;
when the seedling taking and throwing movement mechanism accelerates and moves to a position at a distance of S2 from the seedling taking position, and a height from ends of the seedling taking needles to an upper end surface of the plug tray reaches a set height H2, controlling the lead screw motor by the control system to stop running, so that the seedling taking and throwing movement component stops descending; controlling the walking mechanism by the control system to allow the seedling taking and throwing movement mechanism to decelerate and translate to the seedling taking position;

when the seedling taking and throwing movement mechanism reaches the seedling taking position, controlling the seedling taking needle movement cylinder by the control system to allow the seedling taking needle movement component to move downward, so that the seedling taking needles are inserted into plug seedlings for seedling taking; controlling the lead screw motor by the control system to move upward, to allow the seedling taking and throwing movement component to reach the highest initial position; controlling an executing mechanism by the control system according to a signal sent by the seedling taking and throwing vertical position sensor to allow the seedling taking and throwing movement mechanism to accelerate and move toward the dispersing device;

when the seedling taking and throwing movement mechanism moves to a position at a distance of S3 from the dispersion seedling guiding barrels of the dispersing device, controlling the executing mechanism to decelerate the seedling taking and throwing movement mechanism, until the seedling taking and throwing movement mechanism decelerates and moves to exactly above the dispersion seedling guiding barrels of the dispersing device; controlling the lead screw motor by the control system to move downward according to a signal sent by the seedling taking and throwing front-rear position sensor, so that an overall height of a seedling penetrates into two-thirds of the dispersion seedling guiding barrels; meanwhile, controlling the seedling taking needle movement cylinder by the control system to retract a piston upward, to drive the seedling taking needle movement component to move upward, so that the seedling taking needles retract upward, and the plug seedlings are pushed into the dispersion seedling guiding barrels by the seedling pushing rings; controlling the lead screw motor by the control system to move upward to reset the seedling throwing movement component;

when the plug seedlings fall into the dispersing duckbill ports along the dispersion seedling guiding barrels, controlling a plurality of driving units to respectively drive the corresponding dispersion seedling guiding barrels to move, so that the dispersion seedling guiding barrels are dispersed to two sides of the transverse movement guide rail; controlling piston rods of the opening/closing cylinders to stretch, to allow the dispersing duckbill port opening/closing rods to move downward along the dispersing duckbill port opening/closing hinge, so that the dispersing duckbill ports of the plurality of the dispersion seedling guiding barrels are opened synchronously; the plug seedlings falling into planting duckbill ports of the planting mechanism along the seedling guiding device, and then allowing the piston rods of the opening/closing cylinders to retract to synchronously close the dispersing duckbill ports of the plurality of the dispersion seedling guiding barrels; controlling the plurality of driving units to respectively drive the corresponding dispersion seedling guiding barrels to retract and move in a reverse direction for resetting; and after the plug seedlings fall into the planting duckbill ports of the planting mechanism, allowing the planting mechanism to move downward vertically, opening the planting duckbill ports at a lowest position, planting the plug seedlings into ground, then allowing the planting mechanism to move upward to an initial position, and closing the planting duckbill ports; and after planting is completed, controlling a telescopic length of an electric push rod to adjust an above-ground height of the soil covering wheel component, and performing a soil covering operation on the plug seedlings that are planted.

9. The planting control method of the self-propelled full-automatic dense-planting vegetable transplanter according to claim 8, wherein the set distance S1 is half of a distance between the seedling taking position and a seedling throwing position; S2 is 20 mm to 40 mm; S3 is 20 mm to 40 mm; and the set height H2 is 5 mm to 10 mm.

* * * * *